US005728218A

United States Patent [19]

Kohno et al.

[11] Patent Number: 5,728,218

[45] Date of Patent: Mar. 17, 1998

[54] APPARATUS FOR COVERING SEEDS WITH GEL

[75] Inventors: Yasushi Kohno; Yoichi Ido; Kazushi Nakatsukasa, all of Shizuoka, Japan

[73] Assignee: Yazaki Corporation, Tokyo, Japan

[21] Appl. No.: 757,927

[22] Filed: Nov. 27, 1996

[30] Foreign Application Priority Data

Nov. 29, 1995 [JP] Japan .................................... 7-310701

[51] Int. Cl.[6] ........................................................ B05C 3/00

[52] U.S. Cl. ................................ 118/13; 118/23; 118/24; 118/26; 118/29; 118/407; 118/429

[58] Field of Search ................................ 118/13, 23, 24, 118/26, 29, 407, 429; 427/4

[56] References Cited

U.S. PATENT DOCUMENTS

| | | | |
|---|---|---|---|
| 4,806,357 | 2/1989 | Garrett et al. | 427/4 |
| 5,080,925 | 1/1992 | Kouno | 427/4 |
| 5,254,358 | 10/1993 | Kouno et al. | 427/4 |
| 5,421,882 | 6/1995 | Kouno et al. | 118/23 |
| 5,632,819 | 5/1997 | Geissler | 118/13 |

*Primary Examiner*—Laura Edwards
*Attorney, Agent, or Firm*—Armstrong, Westerman, Hattori, McLeland & Naughton

[57] ABSTRACT

The gel-covering apparatus has an inexpensive configuration that can supply the gelling agent to the seed covering portions under uniform pressure when performing simultaneously a plurality of same processes of covering the seeds with gelling agent. The gelling agent is supplied and filled into the closed spaces (**73*m*) formed between the eight passages (73*c*) and the plungers (73*h*) in the nozzle block (73). The eight pressurizing air cylinders (77) connected to the eight gel supply passages (73B) communicating with the spaces (73*m*) are operated to pressurize the gelling agent in the spaces (73*m*) through the gel passages (75*a*) to cause the plungers (73*h*) in respective passages (73*c*) to move up, opening the valves (73*b*) at the lower ends of the passages (73*c*). At the same time, the seeds to be processed are thrown from above into the passages (73*v*) in the plungers (73*h*) so that the seeds falling from the lower ends of the passages (73*v*) down below the plungers (73*h*) are enclosed by the gelling agent, which is dropped from the spaces (73*m*) through the valves (73*b*) down below the passages (73*c***), to form gelling agent-covered seeds.

8 Claims, 19 Drawing Sheets

F I G. 2
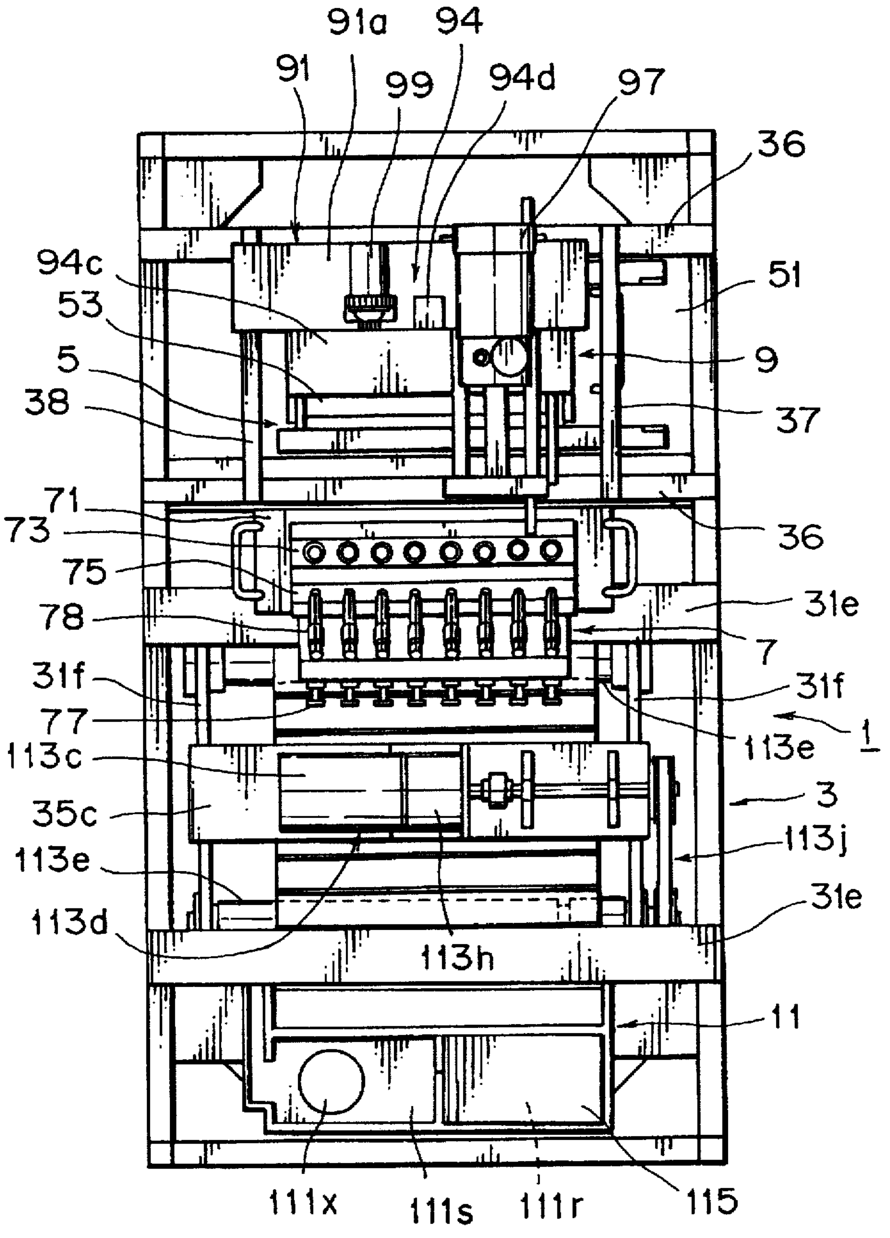

APPARATUS FOR COVERING SEEDS WITH GEL

BACKGROUND OF THE INVENTION

1. Field of the Invention

The present invention relates to an apparatus for covering seeds with a polymeric gelling agent.

2. Description of the Related Art

There are known gel-covered seeds, the seeds that are covered with a polymeric gel having elasticity and containing nutritious substances and sterilizers. Not only are the gel-covered seeds effective in protecting seeds against being eaten by animals and in sterilizing them, they have many other features, such as increasing the size of seeds for easy handling and efficient sowing and improving the rate of germination through absorption of nutritious substances in the gel.

Focusing on these features, this applicant has proposed apparatuses for automatically covering seeds with gel. FIG. 22 shows a front view of an example conventional apparatus proposed by this applicant. In the figure, a gel-covering apparatus generally denoted A has a stand B, a seed hopper C, a seed transfer section D, a gelling agent tank E, a gel processing section F, a hardening tank G, and a water cleaning tank J.

The seed hopper C is supported vertically movable through an air cylinder C1 in the upper half of the stand B and is located slightly offset to one side from the center of the width of the stand B. The seed hopper C, as shown in FIG. 23, is almost circular in plan view and open upward and, as shown in FIG. 22, its lower part is nearly conical with its bottom lowering toward the center. The seed hopper C accommodates a large number of seeds (not shown) to be covered with gel. The gelling agent tank E is installed in the lower half of the stand B near the lateral side and contains a highly viscous liquid gelling agent to cover seeds.

The gel processing section F is installed in the upper half of the stand B at almost the center of the width of the stand B. The gel processing section F has a processing nozzle F1 whose interior is formed as a double tube. The processing nozzle F1 has its inner tube supplied with seeds from the upper end of the processing nozzle F1 and the outer tube supplied with a gelling agent from the gelling agent tank E through the side of the processing nozzle F1 and a tube not shown. In the gel processing section F, a plunger (not shown) in the processing nozzle F1 pumps a predetermined amount of the gelling agent out of the lower end of the outer tube while at the same time seeds are delivered one seed at a time from the lower-end of the inner tube. As a result, seeds covered on the outer side with the gelling agent fall by their own weight.

The seed transfer section D has a rotary actuator D1 installed in the upper half of the stand B and located between the seed hopper C and the processing nozzle F1; a long rotary arm D3 rotatably supported at its intermediate part by the rotary actuator D1 so that it can rotate in a horizontal plane; and two disposable suction tips D5, D7 removably attached to the underside of both ends of the rotary arm D3. The seed transfer section D has the rotary actuator D1 turn the rotary arm D3 180 degrees at a time so that the rotary arm D3 assumes alternately a first state in which one of the suction tips D5 is located above the seed hopper C and the other suction tip D7 is located above the processing nozzle F1 and a second state in which the first suction tip D5 is located above the processing nozzle F1 and the second suction tip D7 is located above the seed hopper C.

The hardening tank G is installed at virtually a vertical center of the stand B and extends horizontally from below the processing nozzle F1, from which the gelling agent-covered seeds fall by their own weight, to the laterally other side of the stand B. In the hardening tank G a liquid hardener is flowing which reacts with the gelling agent coated over the seeds to harden the gelling agent and thereby form gel-covered seeds. Further, in the hardening tank G, there is rotatably installed a screw feeder G1, as shown in FIG. 23, which transfers the gel-covered seeds from below the processing nozzle F1 to the laterally other side in the hardening tank G.

The water cleaning tank J is located behind the hardening tank G and extends horizontally along the hardening tank G. In the water cleaning tank J water is flowing to clean the gel-coated seeds, whose gelling agent was hardened in the hardening tank G. Also in the water cleaning tank J a screw feeder J1 is rotatably installed to transfer the gel-covered seeds in a direction opposite to the direction in which the gel-covered seeds are fed in the hardening tank G.

In the conventional gel-covering apparatus A with the above construction, the seeds are covered with gel as follows.

In the first state of the seed transfer section D, the air cylinder C1 is activated to raise the seed hopper C and the first suction tip D5 is evacuated to a negative pressure to draw in the seeds from the seed hopper C. Then, the seed hopper C is lowered by the air cylinder C1, after which the rotary arm D3 is turned 180 degrees horizontally by the rotary actuator D1 to set the seed transfer section D in the second state. In this second state, the first suction tip D5 is set to a positive pressure to throw the picked-up seeds into the inner pipe of the processing nozzle F1 from the top. At the same time, the air cylinder C1 is activated to raise the seed hopper C, from which the seeds are drawn into the second suction tip D7 by setting the tip to a negative pressure. These operations are repeated to transfer the seeds from the seed hopper C to the processing nozzle F1. If the seeds in the seed hopper C fail to be sucked into the suction tips D5, D7 with the hopper raised by the air cylinder C1, the seed hopper C is vibrated up and down in small pitches to agitate the seeds to make them more accessible to the front end of the suction tips D5, At the same time that the seeds are thrown into the inner tube of the processing nozzle F1, the plunger is activated to pump a predetermined amount of gelling agent out of the front end of the processing nozzle F1 together with the seeds, causing the seeds to be covered with the gelling agent and fall by their own weight from the front end of the processing nozzle F1 into the hardening tank G. While the coated seeds that fell into the hardening tank G are moved by the screw feeder G1, the gelling agent adhering to the outer surface of the seeds is hardened so that the seeds are covered with gel. The gel-covered seeds that have reached the laterally opposite side in the hardening tank G are driven to the water cleaning tank J side riding over and crossing a separation wall G3 (see FIG. 23) between the hardening tank G and the water cleaning tank J by the rotation of the screw feeder G1 and the force of air blown out from an air blow opening not shown in synchronism with the rotation of the screw feeder G1.

The gel-covered seeds that were transferred to the water cleaning tank J are cleaned at their surfaces by a water flow made by the screw feeder J1 while being moved along the water cleaning tank J by the water flow. The gel-covered seeds that have reached the other end of the water cleaning tank J are then driven by the screw feeder J1 to ride over a separation wall J3 (FIG. 23) at the end of the water cleaning tank J and move into a discharge opening K (FIG. 23), from which the gel-covered seeds are recovered onto a product receiver (not shown) placed at the bottom of the gel-covering apparatus A. Further, the remaining amount of seeds in the seed hopper C is monitored at all times and, when it runs low, the seeds are supplied into the seed hopper C.

As described above, the gel-covering apparatus A of the conventional construction has only one processing nozzle F1. When, as part of an effort to increase the overall processing capacity of the apparatus, the number of processing nozzles F1 and the supply means such as pumps for supplying gelling agent from the gelling agent tank E is increased, the supply pressures of gelling agent for the processing nozzles F1 must be made equal. Otherwise, the amount of gelling agent adhering to the seeds and therefore the diameter of the seeds will vary among the processing nozzles F1.

To deal with this situation, it is conceivable to monitor the supply pressures, at which the supply means corresponding to the respective processing nozzles F1 supply the gelling agent from the gelling agent tank E, and to perform a feed-back control to make the supply pressures equal. This arrangement results in an excess increase in the number of parts and greater complexity of control and thus can hardly be said to be a proper countermeasure.

Further, in the gel-covering apparatus A of the above-mentioned conventional construction, when the gelling agent in the gelling agent tank E is supplied to the processing nozzle F1, air in the supply passage may get mixed in the gelling agent being supplied, causing variations in the amount of gelling agent delivered from the front end of the processing nozzle F1. This in turn will cause variations in the amount of gelling agent attached to the seeds and therefore the diameter of the gelling agent-covered seeds formed in the processing nozzle F1.

The present invention has been accomplished to overcome the above drawbacks. A primary objective of this invention is to provide an apparatus for covering seeds with gel, which, when performing simultaneously a plurality of processes of covering seeds with gelling agent to improve the processing capacity, can supply the gelling agent to a plurality of gelling agent covering sections under equal pressures at low cost. A second objective of this invention is to provide an apparatus for covering seeds with gel, which can securely prevent air from getting mixed in the gelling agent being supplied to the gelling agent coating section.

SUMMARY OF THE INVENTION

To achieve the primary objective, the apparatus for covering seeds with gel comprises: a plurality of processing nozzles each comprising a cylindrical plunger accommodated vertically movable in a vertical open passage, the plunger having an internal passage extended axially therethrough; a valve seat at a lower end of the vertical open passage, which is closed by a lower end of the plunger; and a closed space in the vertical open passage, defined between the valve seat and an upper part of the plunger; and a single manifold connected to each of the closed spaces in the vertical open passages of the processing nozzles, wherein the manifold is filled with a gelling agent, the filling pressure of the gelling agent in the manifold is increased to distribute the gelling agent from the manifold to the closed space of each of the processing nozzles, and wherein the filling pressure on the gelling agent in the closed spaces is increased to move the plungers upwardly in the vertical open passages to open the valve seats, and at the same time seeds to be processed are thrown from above into the internal passages of the plungers such that the seeds discharged from lower ends of the internal passages of the plungers are enclosed with the gelling agent flown out through the valve seats.

In the apparatus for covering seeds with gel the closed spaces in the vertical open passages each communicates through a respective gel supply passage with the manifold, the gel supply passage is connected with a branched closed passage into which the gelling agent flowing from the manifold to the closed space can flow, and an air vent valve is connected to an end of the closed passage and opened and closed to communicate the inside of the closed passages with the outside.

The apparatus for covering seeds with gel further comprises pressurizing cylinders in communication through the gel supply passages to respective ones of the closed spaces for increasing and reducing the filling pressure on the gelling agent in the closed spaces, wherein the air vent valves each extends on the same plane as a respective one of the pressurizing cylinders and of the vertical open passages extends.

According to the apparatus for covering seeds with gel, with the manifold filled with the gelling agent the filling pressure of the gelling agent in the manifold is increased to make the pressures of the gelling agent supply passages that communicate the manifold with the closed spaces of the processing nozzles uniform and equal to the manifold's inner pressure. Thus, the gelling agent supply pressures from the gelling agent supply passages having equalized pressures to the closed spaces of the processing nozzles become equal. This in turn makes equal the amounts of gelling agent ejected from the processing nozzles to cover the seeds. In this way, it is possible to make equal among the nozzles the grain sizes of the covered seeds and the amount of gelling agent used.

According to the apparatus for covering seeds with gel, because air—if it is mixed as bubbles in the gelling agent in the gel supply passages leading from the manifold to the closed spaces and in the gelling agent in the closed passages branched from the gel supply passages—is drawn to and retained in the terminal portions of the closed passages, the air vent valves are opened prior to filling the gelling agent from the manifold into the closed spaces in the passages to discharge the collected air in the terminal portions of the closed passages. Therefore, the gelling agent can be prevented from being supplied to the processing nozzles with air bubbles mixed in it. As a result, the amounts of gelling agent ejected from the nozzles to cover the seeds are made equal, rendering the grain sizes of the covered seeds and the amount of gelling agent used constant and equal among the nozzles.

Further, according to the apparatus for covering seeds with gel, when the gelling agent filling pressures in the closed spaces are increased to open the valve seats of the closed passages by moving up the plungers in the passages and when the raising of the filling pressure is done by the pressurizing cylinders provided adjacent to the closed spaces, each air vent valve is arranged to extend in a plane that extends in directions including an extension direction of the pressurizing cylinder and an extension direction of the passage, so that the space around the passage occupied by the pressurizing cylinder and the air vent valve extends in only one virtually vertical plane including this passage. Therefore, the required space surrounding the processing nozzle can be accommodated in a single plane, not in a plurality of planes, thus reducing the overall space required by the gel-covering apparatus as a whole and its size.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 2 is a plan view of the apparatus for covering seeds with gel shown in FIG. 1;

DESCRIPTION OF THE PREFERRED EMBODIMENTS

Now, the gel-covering apparatus for seeds according to this invention will be described in conjunction with preferred embodiments by referring to the accompanying drawings of this specification.

Figure 1:
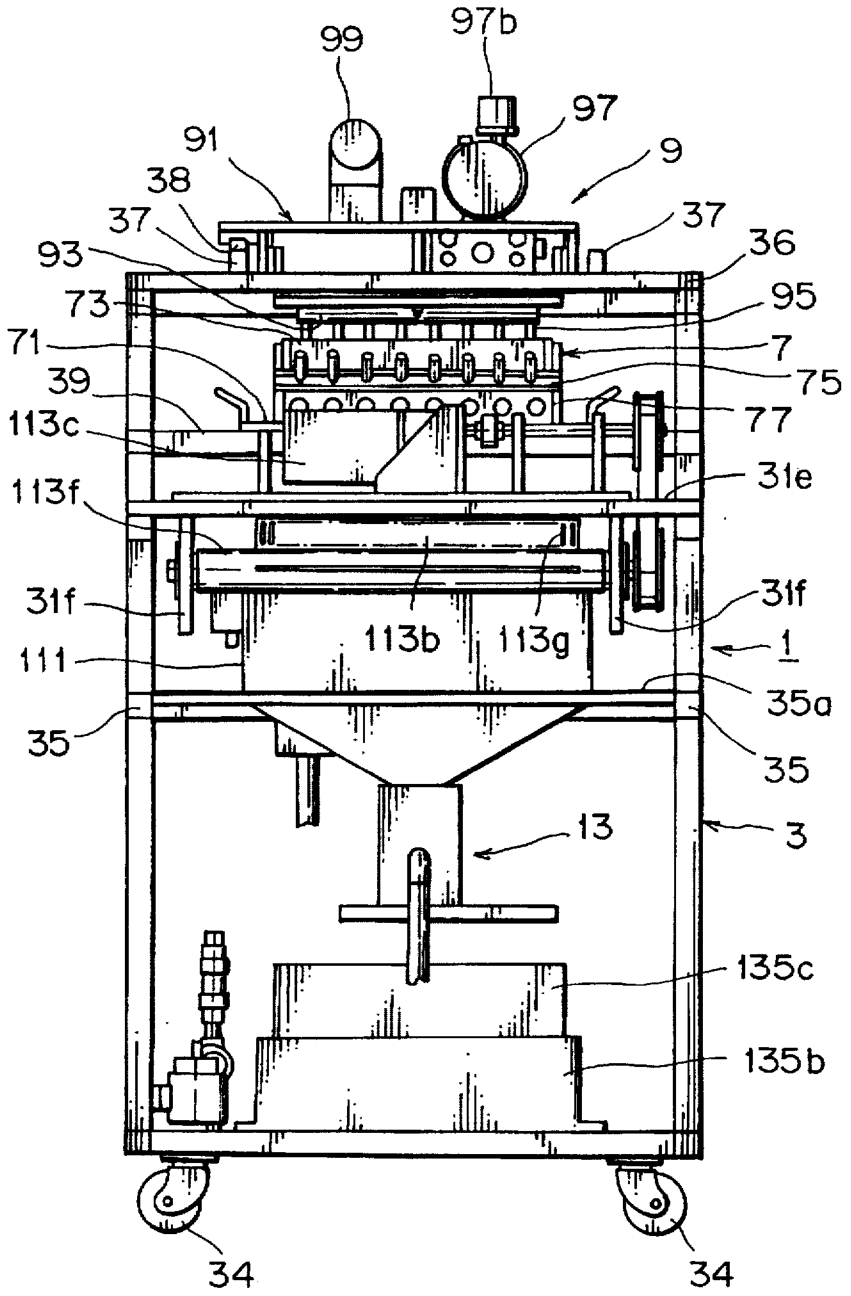
FIG. 1 is a front view showing the outline configuration of the apparatus for covering seeds with gel, which adopts the gel-covering apparatus of one embodiment of this invention.
Figure 3:
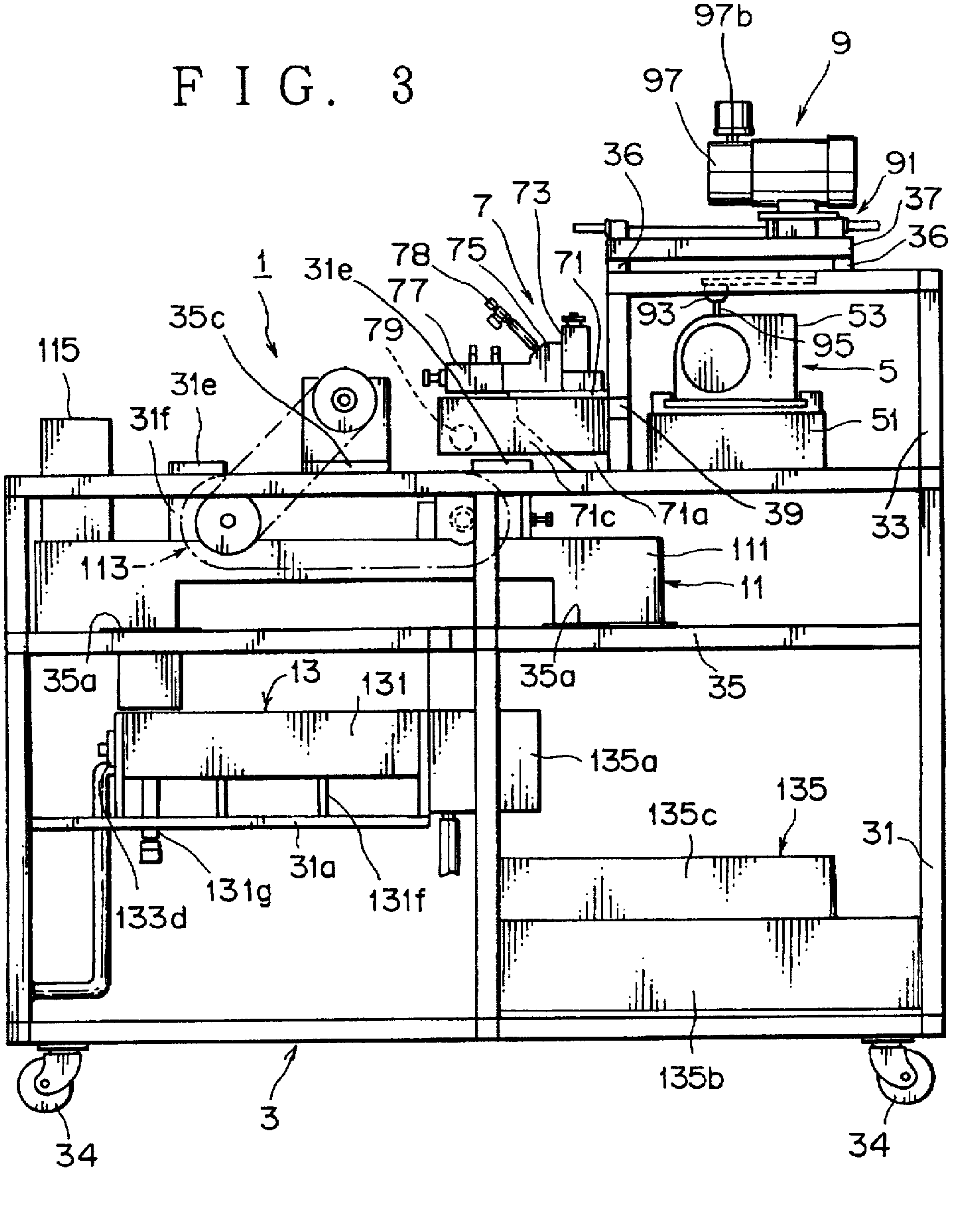
FIG. 3 is a side view of the apparatus for covering seeds with gel shown in FIG. 1.

FIG. 1 is a front view showing an outline configuration of the apparatus for covering seeds with gel that employs a gel-covering section according to one embodiment of this invention. FIG. 2 and FIG. 3 are a plan view and a side view of the same, respectively. In the figures, a gel-covering apparatus of this embodiment generally denoted 1 has a stand 37 a seed supply section 5, a gel covering section 7, a seed transfer section 9, a gel hardening section 11, and a gel cleaning section 13.

The stand 3, as shown in FIG. 3, is formed of a frame that is open to its sides. The frame consists of a main frame 31, which is virtually a rectangle in plan view that is elongate in a longitudinal direction, and an auxiliary frame 33 erected on the main frame 31 near its rear end. The main frame 31 is supported transportable by casters 34 at four corners of the frame bottom. A lateral reinforcement frame 35 is horizontally mounted slightly above the vertical center of the main frame 31. As shown in the enlarged plan view of the auxiliary frame and the seed transfer section of FIG. 4, main upper crosspieces 36 are horizontally laid between the left and right sides of the auxiliary frame 33 at the front end and slightly in front of the rear end of the auxiliary frame 33.

Figure 4:
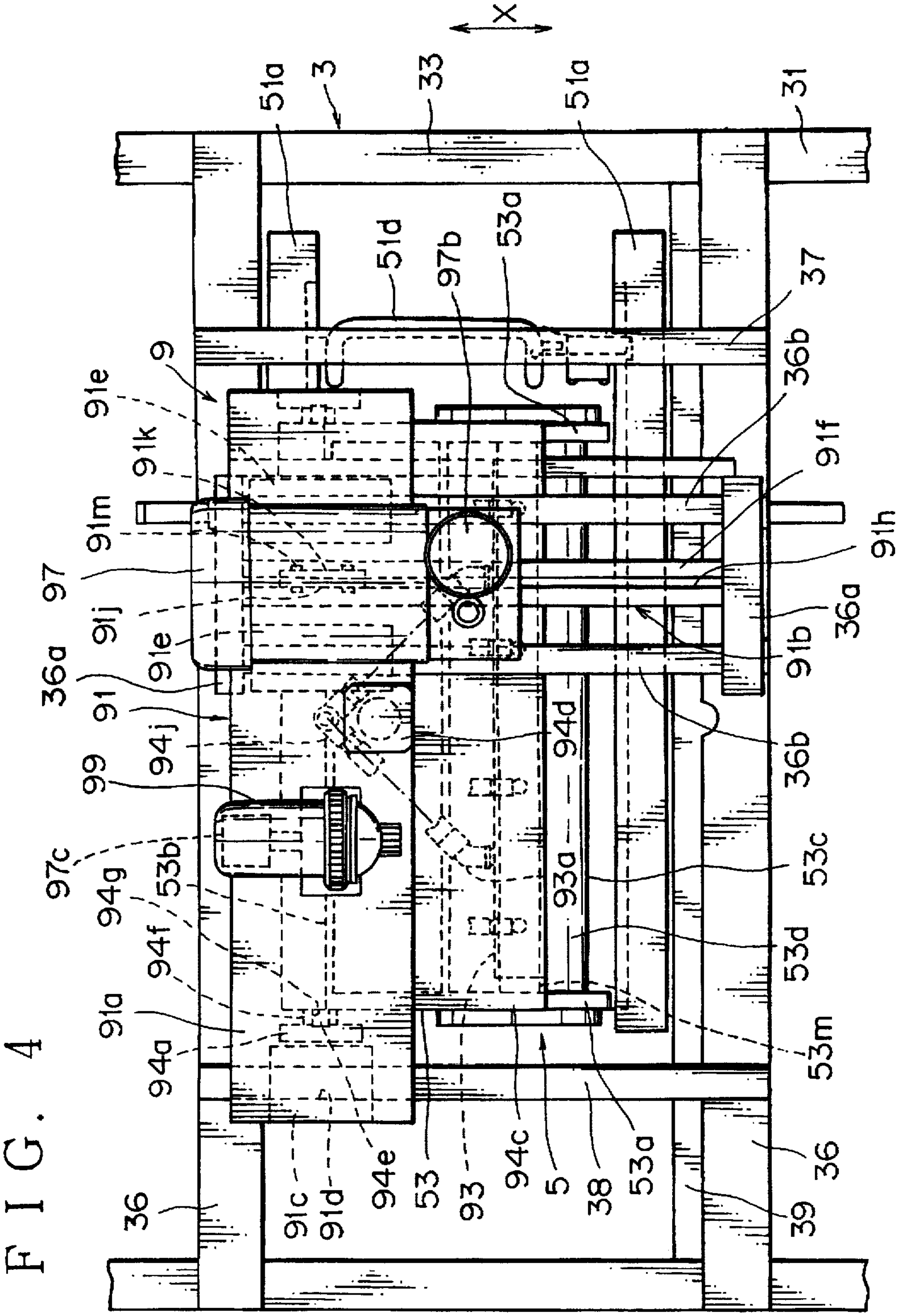
FIG. 4 is an enlarged plan view of an auxiliary frame and a seed transfer section shown in FIG. 2.

Two sub-upper crosspieces 37 are horizontally laid connecting the front and rear main upper crosspieces 36 at positions spaced in the lateral direction of the auxiliary frame 33 to reinforce the main upper crosspieces 36. On the left sub-upper crosspiece 37 is supported a guide rail 38 (FIG. 5) that extends parallel with this sub-upper crosspiece 37. As shown in FIG. 1, a front lateral cross piece 39 is horizontally mounted between the front, lateral side portions of the auxiliary frame 33 at a level slightly lower than the vertical center of the auxiliary frame 33. Support plates **36*a* are placed, as shown in FIG. 4, on the main upper crosspieces 36 at positions slightly off-centered laterally toward the right sub-upper crosspiece 37. Spanning horizontally between the support plates 36*a* are two laterally spaced guide shafts 36*b*** that extends parallel to each other.

The seed supply section 5 is to supply seeds that are to be processed into gel-covered seeds and, as shown in FIG. 3, is located inside the auxiliary frame 33 on the main frame 31. The seed supply section 5 has a base 51 securely fixed on the main frame 31 and a seed tank 53 fixed on the base 51.

Figure 5:
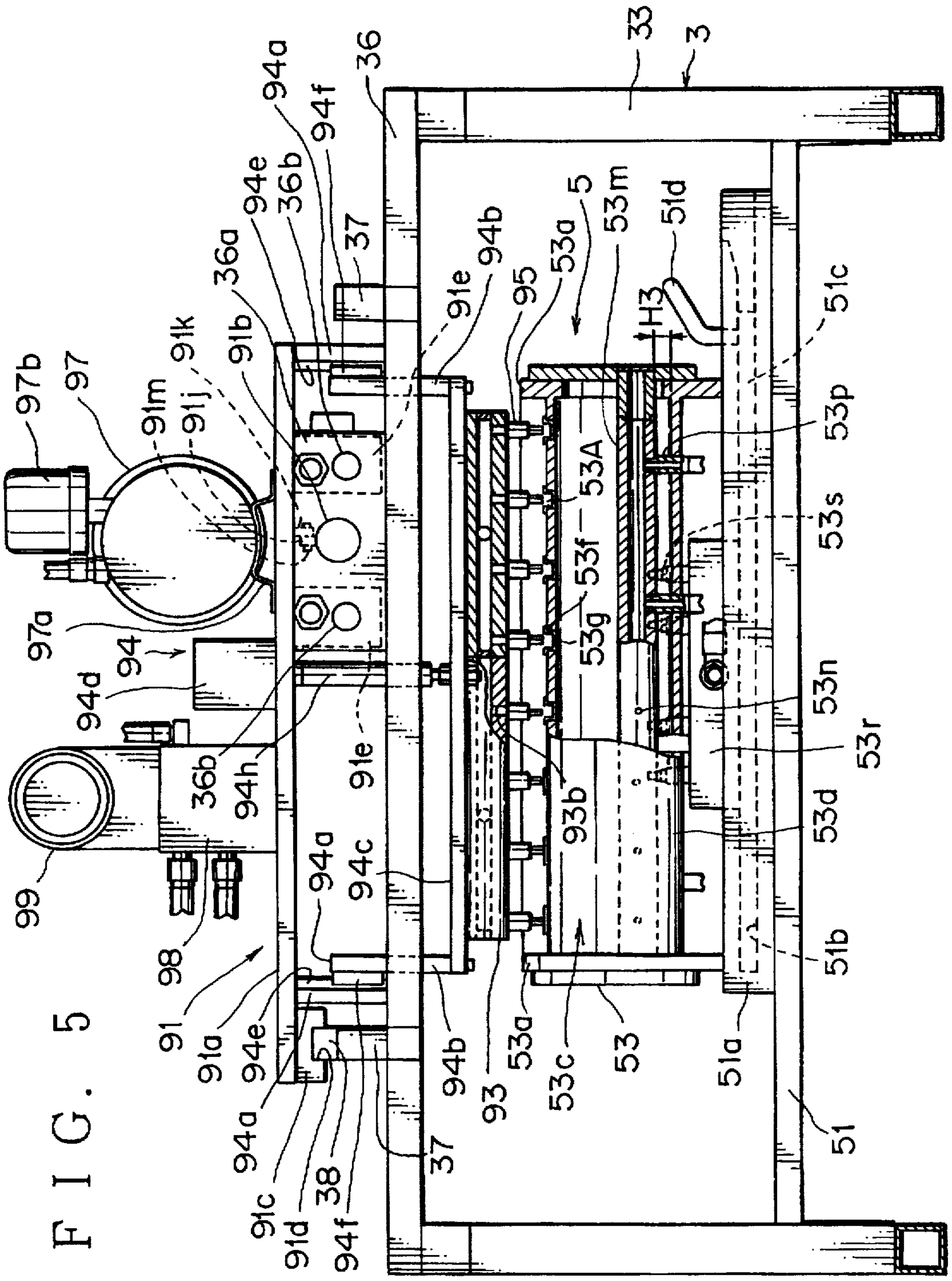
FIG. 5 is a partly cutaway, enlarged front view of a seed supply section and the seed transfer section shown in FIG. 2.
Figure 6:
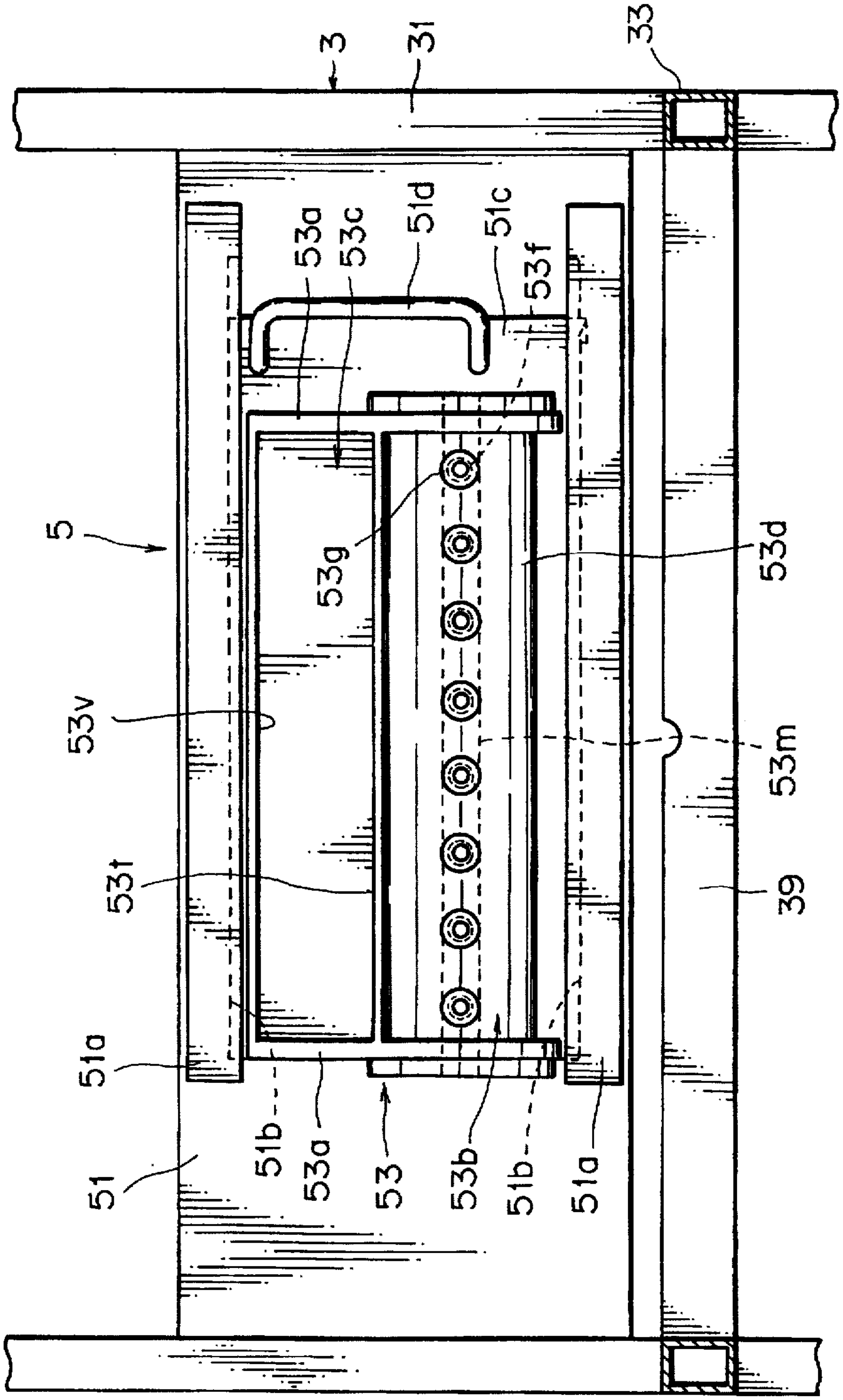
FIG. 6 is an enlarged plan view of the seed supply section shown in FIG. 2.
Figure 7:
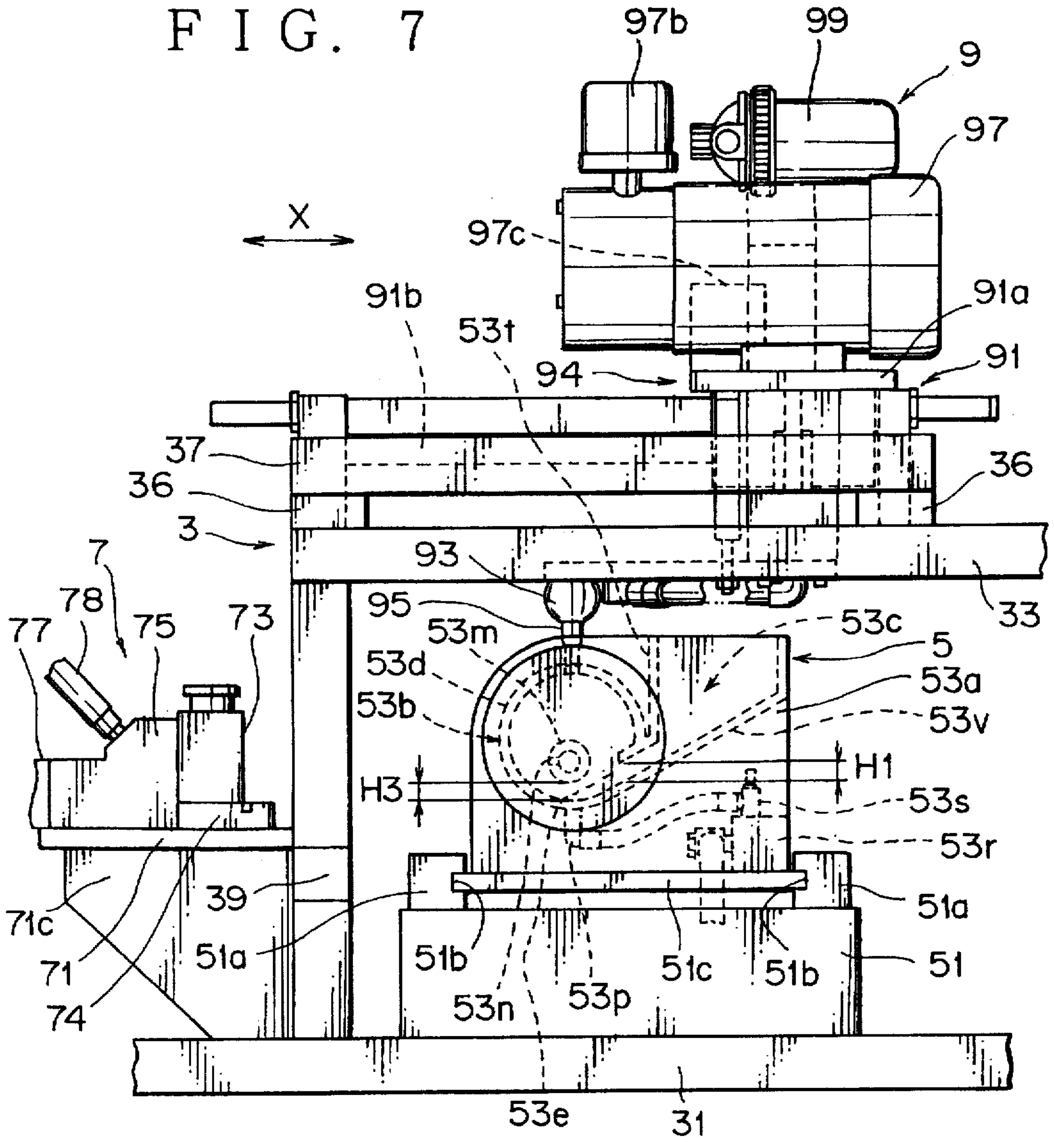
FIG. 7 is an enlarged side view of the seed supply section and the seed transfer section shown in FIG. 2.

FIG. 5 is an enlarged front view of the seed supply section and the seed transfer section. FIG. 6 is an enlarged plan view of the seed supply section. FIG. 7 is an enlarged side cross section of the seed supply section and the seed transfer section. The base 51, as shown in FIG. 6, is virtually a rectangle which is laterally long in plan view extending between the lateral side portions of the main frame 31. Parallel guide rails **51*a* are attached to the front and rear ends of the base 51**.

The base 51 has formed on the inner opposing sides of the guide rails **51*a* guide grooves 51*b* which are U-shaped in cross section and extend over the entire length of the guide rails 51*a* as shown in FIG. 6 and 7. Between these guide rails 51*a* is supported a slide plate 51*c* whose front and rear ends are fitted in the corresponding guide grooves 51*b* so that the slide plate 51c can be drawn out toward the right side of the main frame 31**.

In FIG. 6, denoted **51*d* is a handle used to pull the slide plate 51*c***.

The seed tank 53 is mounted on the slide plate 51c and made, for example, of an acrylic resin plate and has a pair of side walls 53a erected from the sides of the slide plate 51c as shown in FIG. 5 and a tank body portion 53b and a hopper portion 53c both formed between the side walls 53a, as shown in FIG. 6.

The tank body portion 53b is virtually a laterally long cylinder formed of a cylindrical circumferential wall 53d closed at the ends with the side walls 53a, as shown in FIG. 6. The circumferential wall 53d has a horizontally long slit 53e formed in the lower part of the tank body portion 53b between the side walls 53a, as shown in FIG. 7. The slit 53e has a vertical width H1. The top part of the circumferential wall 53d is formed with eight through-holes 53f, virtually circular in plan view and arranged laterally at equal intervals, as shown partly cutaway in FIG. 5. Each of the through-holes 53f is removably fitted with an annular adapter 53g, which has a hole 53A almost at the center.

Figure 8:
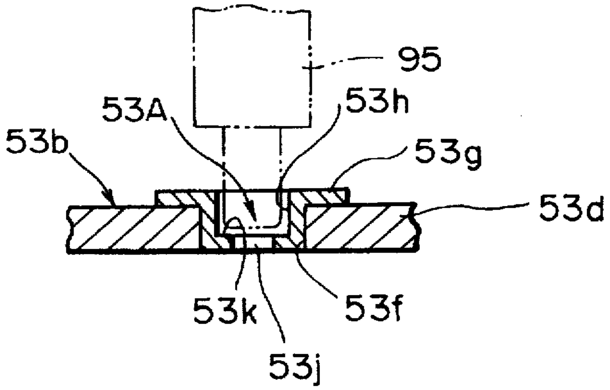
FIG. 8 is an enlarged cross section of an adapter shown in FIG. 5.

The inner circumferential surface of the hole 53A of the adapter 53g has a large-diameter portion 53h on the outer side of the circumferential wall 53d of the tank body portion 53b and a small-diameter portion 53j on the inner side, as shown in an enlarged cross section of FIG. 8. There is a step portion 53k at the boundary between the large-diameter portion 53h and the small-diameter portion 53j. There are prepared two or more kinds of adapters 53g with differing inner diameters of the holes 53A. According to the size of the seeds accommodated in the tank body portion 53b, the adapters 53g with the smallest of the small-diameter portions 53j through which the seeds can pass are selectively installed in the through-holes 53f.

Further, as shown in FIG. 7, laid in the tank body portion 53b between the side walls 53a is a cylindrical air chamber 53m which is sufficiently smaller in diameter than the tank body portion 53b and is held a small distance H3—almost equal to the vertical width H1 of the slit 53e—above the bottom inner circumferential surface of the tank body portion 53b. The air chamber 53m is divided at nearly the center between the side walls 53a into two lateral portions. The left and right air chamber 53m portions are formed with laterally aligned and equally spaced blow ports 53n at their front circumferential part on a side opposite the slit 53e side.

Each of the divided air chamber 53m portions is connected at their bottom with the ends of two joints 53p, as shown in FIG. 5. These joints 53p pierce through the bottom of the tank body portion 53b and extend outside, with the other ends of the joints 53p connected through a high-pressure hose not shown to four joints 53s in a manifold 53r which is located adjacent to the rear side of the tank body portion 53b and securely mounted on the base 51, as shown in FIG. 7. The manifold 53r is supplied compressed air from an external air compressor (not shown) outside the gel-covering apparatus 1 through a pressure reducer not shown. The compressed air is supplied to each of the divided air chamber 53m portions through the joints 53s, 53p and high-pressure hose.

The hopper portion 53c is formed by a front plate 53t, which is almost vertically erected from the circumferential wall 53d at the upper side of the slit 53e in the tank body portion 53b, and a rear plate 53v, which is inclined upwardly rearward from the lower side of the slit 53e, extending progressively away from the tank body portion 53b, with its front end portion rising nearly vertically. The rear plate 53v extends in a tangential direction of the circumferential wall 53d portion that extends from near the bottom of the tank body portion 53b in a rear upper direction. The rear plate 53v is formed integrally with the circumferential wall 53d.

The gel covering section 7 is to cover seeds with gelling agent to form gel-covered seeds and includes, as shown in FIG. 3, a base 71 arranged on the main frame 31 in front of the auxiliary frame 33 and extending between the left and right ends of the main frame 31; a nozzle block 73 arranged on the base 71; a gel accommodating block 75 mounted securely on the base 71 in front of the nozzle block 73; eight pressurizing air cylinders 77 and eight air vent valves 78 connected to the gel accommodating block 75; and a manifold 79 for supplying gelling agent to the gel accommodating block 75.

Figure 9:
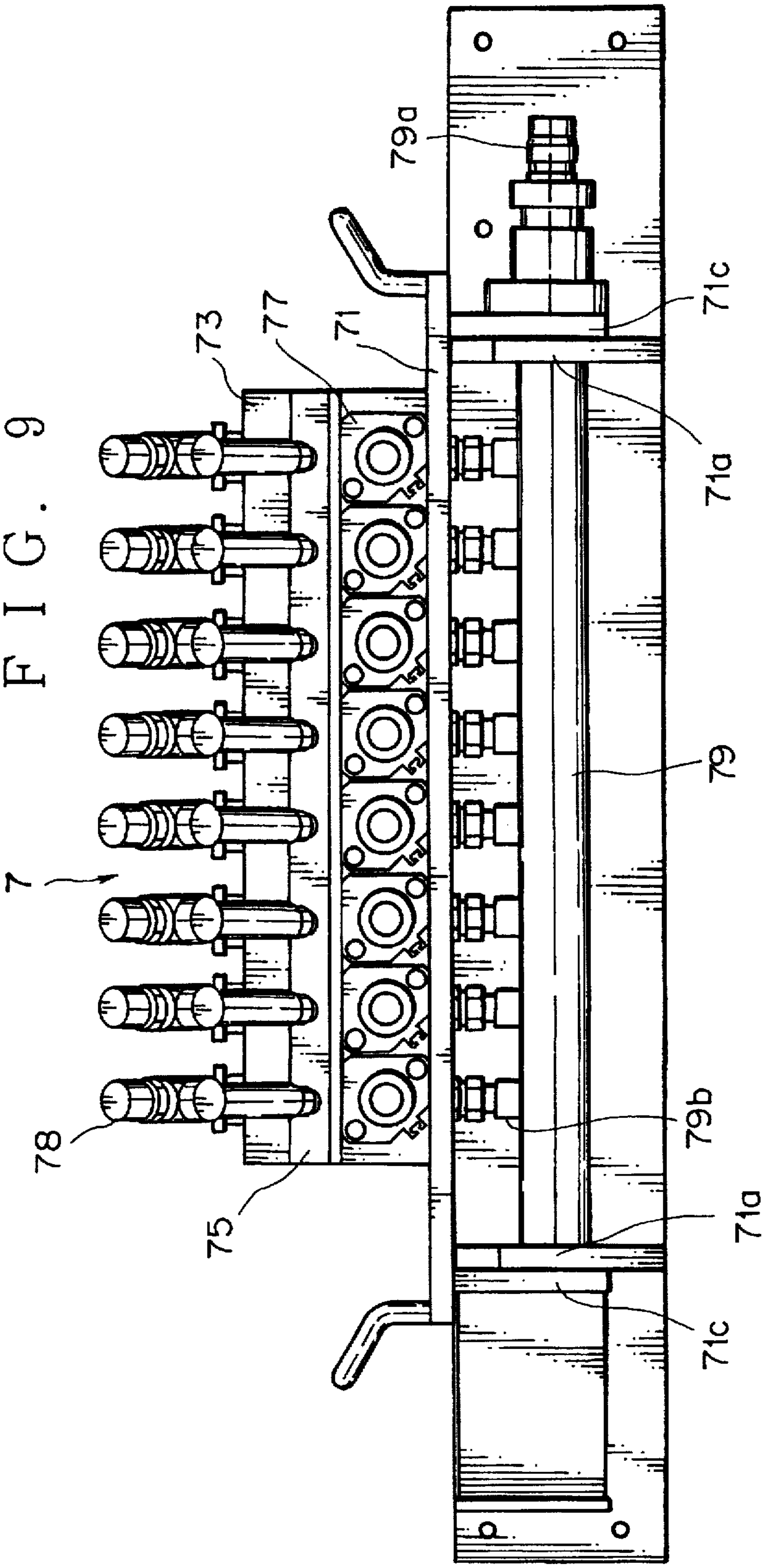
FIG. 9 is an enlarged front view of a gel covering section shown in FIG. 2.
Figure 10:
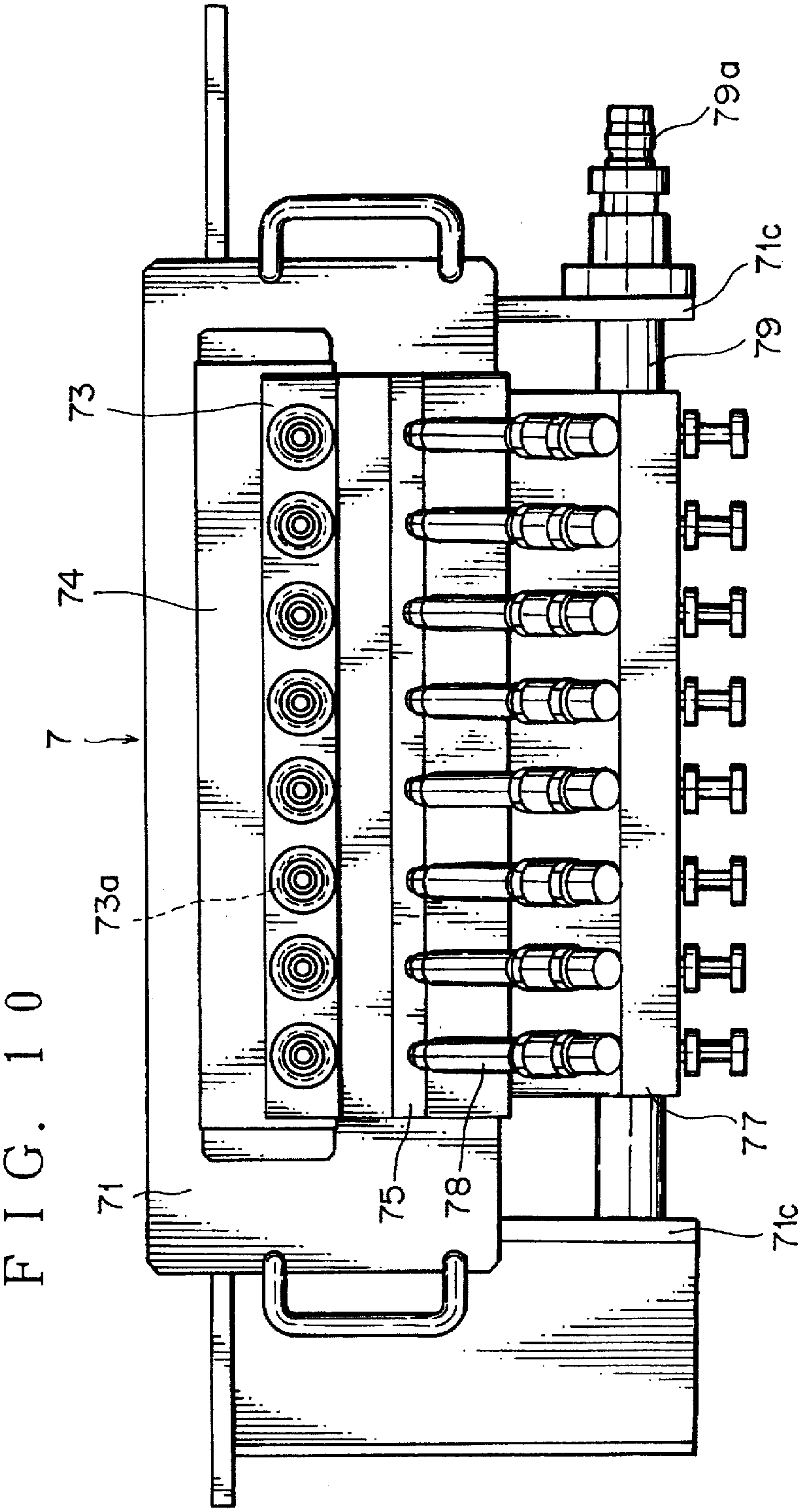
FIG. 10 is an enlarged plan view of the gel covering section shown in FIG. 2.
Figure 11:
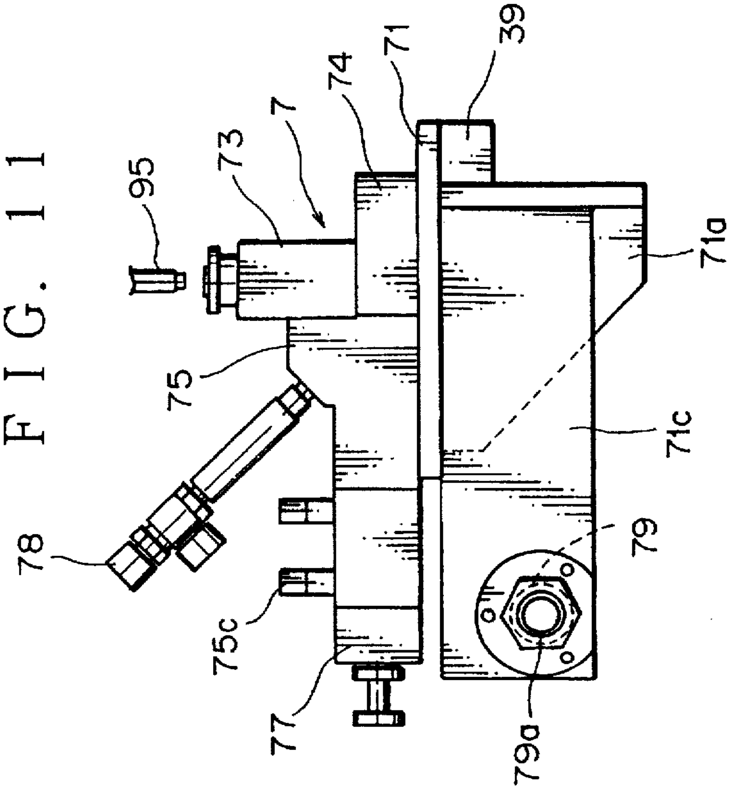
FIG. 11 is an enlarged side view of the gel covering section shown in FIG. 2.

FIG. 9 is an enlarged front view of the gel covering section, FIG. 10 is an enlarged plan view of the same, and FIG. 11 is an enlarged side view of the same. The base 71 is, as shown in FIG. 10, virtually a rectangle which is laterally long in plan view. The rear end of the base 71, as shown in FIG. 3, is secured to the front lateral cross piece 39 of the auxiliary frame 33. In this state, the base 71 is supported horizontal by two left and right reinforcement plates 71a projecting downwardly from the front lateral sides of the front lateral cross piece 39 of the auxiliary frame 33, as shown in FIG. 11.

The nozzle block 73 is arranged on a gate-shaped base frame 74 installed between the left and right ends of the base 71 and, as shown in FIG. 10, is virtually a rectangle in plan view which is laterally long and longitudinally shorter than the base 71. The upper surface of the nozzle block 73 is formed with eight laterally and equally spaced seed injection ports 73a. The underside portion of the nozzle block 73 corresponding to the seed injection ports 73a are formed with valves 73b (corresponding to valve seats) which have smaller inner diameters than the seed injection ports 73a, as shown in the enlarged side cross section of FIG. 12. The nozzle block 73 has eight passages 73c passing vertically therethrough to connect the seed injection ports 73a and the corresponding valves 73b. In this embodiment, the gelling agent applying nozzle mainly comprises the seed injection ports 73a, valves 73b, passages 73c, and plungers 73h (described later) installed in the passages 73c.

Each of the passages 73c has a large-diameter portion 73d communicating with and almost equal in diameter to the seed injection port 73a and a small-diameter portion 73e communicating with the valve 73b and slightly larger in diameter than the valve 73b and smaller than the large-diameter portion 73d. The inner circumferential surface of the passage 73c is formed with a step portion 73f between the large-diameter portion 73d and the small-diameter portion 73e at a location slightly off-centered vertically toward the seed injection port 73a. The large-diameter portion 73d is formed with a female screw 73g.

In each of the passages 73c a cylindrical plunger 73h is installed vertically movable. The plunger 73h has an outer diameter corresponding to the inner diameter of the small-diameter portion 73e. On the outer circumference of the plunger 73h is formed a flange 73j that has an outer diameter corresponding to the inner diameter of the large-diameter portion 73d of the passage 73c. One end portion of the plunger 73h a certain distance from this flange 73j is formed into a small-diameter portion 73k (corresponding to the lower end of the plunger) which is smaller in outer diameter than the other end.

The plunger 73h is inserted into the passage 73c from above through the seed injection port 73a with its small-diameter portion 73k directed downward. With the flange 73j engaged with the step portion 73f of the passage 73c, the upper end (second end) of the plunger 73h projects upwardly from the seed injection port 73*a*, the lower end (first end) of the plunger 73*h*, i.e., the lower end of the small-diameter portion 73*k*, is virtually flush with the underside of the nozzle block 73 and the circumferential surface of the lower end of the plunger 73*h* fits tightly in the inner circumferential surface of the valve 73*b* without a gap, closing the valve 73*b*. In this condition, an annular space 73*m* (corresponding to the closed space) is defined between the small-diameter portion 73*e* of the passage 73*c* and the small-diameter portion 73*k* of the plunger 73*h*. This space 73*m* communicates through the passage 73*n* to the front side of the nozzle block 73 on the gel accommodating block 75.

In the above state, an annular space 73*p* is formed between the circumferential surface of the plunger 73*h* higher than the flange 73*j* and the large-diameter portion 73*d* of the passage 73*c*. A coil spring 73*r* is installed in this space 73*p*. The female screw 73*g* of the large-diameter portion 73*d* receives a male screw 73*t* of a cap 73*s*. With the cap 73*s* screwed into the passage 73*c*, the end surface of the male screw 73*t* presses the coil spring 73*r* toward the flange 73*j* side. Hence, the plunger 73*h* is urged by the coil spring 73*r* through the flange 73*j* to cause the lower end of the small-diameter portion 73*k* to close the valve 73*b*.

Figure 12:
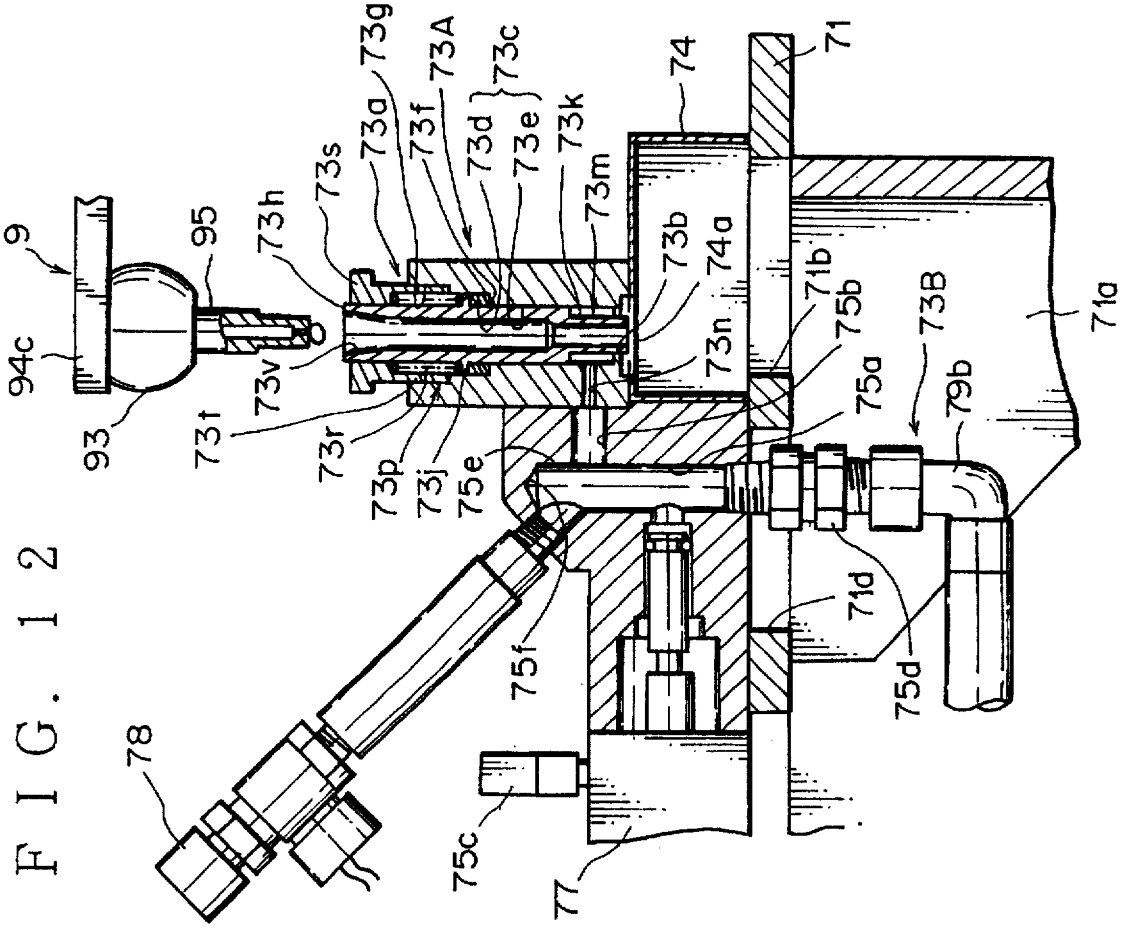
FIG. 12 is an enlarged side cross section of a nozzle block of FIG. 11.

In FIG. 12, reference number 73*v* represents a passage which pierces through the plunger 73*h* and has an inner diameter nearly equal to the large-diameter portion 53*h* having the largest of the inner diameters of several kinds of adapters 53*g*. Where they face the valves 73*b*, the base frame 74 and the base 71 have passage holes 74*a*, 71*b*, respectively, to allow the grain-like gelling agent dropping from the valve 73*b* to pass through the base 71 downwardly. There are prepared two or more kinds of plungers 73*h* with differing outer diameters of the small-diameter portion 73*k*. As in the case of the adapter 53*g*, a plunger 73*h* whose small-diameter portion 73*k* has the most appropriate size of the annular space 73*m* for the size and shape of the seeds transferred from the seed supply section 5 to the gel covering section 7 is selectively installed in each passage 73*c* so that an adequate amount of gelling agent for covering the seeds can be dropped.

The gel accommodating block 75, as shown in FIG. 10, is virtually a rectangle in plan view which is elongate in lateral direction, its lateral length corresponding to that of the nozzle block 73. In the gel accommodating block 75 are formed eight downwardly opening gel passages 75*a* that are arranged laterally at equal intervals corresponding to the passages 73*c* of the nozzle block 73, as shown in FIG. 12.

The upper end portion of each gel passage 75*a* communicates through the passage 75*b* with the rear side of the gel accommodating block 75 that faces the corresponding passage 73*n* in the nozzle block 73. Through the passages 75*b* and the passages 73*n* of the nozzle block 73, communication is established between the gel passages 75*a* and the spaces 73*m* of the corresponding passages 73*c* in the nozzle block 73.

The pressurizing air cylinders 77 (corresponding to the pressure step-up cylinders) are horizontally connected to the front side of the gel accommodating block 75 that faces the passages 75*b*. The interior of each pressurizing air cylinder 77 communicates with the corresponding gel passage 75*a* at a point below the passage 75*b*. In FIG. 12, reference numeral 75*c* indicates a speed controller to adjust the speed of the extension and contraction operation of the pressurizing air cylinder 77. At the lower ends of the gel passages 75*a* there are provided check valves 75*d* to prevent a backflow from the gel passages 75*a* toward the outside.

The air vent valves 73 are connected at an angle of about 45*x* to the sloped front upper part of the gel accommodating block 75 to which the pressurizing air cylinders 77 are connected. The interior of the air vent valves 73 communicates with the upper end 75*f* (corresponding to the front end of the enclosed passage) of the gel passage portion 75*e* (corresponding to the enclosed passage) higher than the passage 75*b*.

The manifold 79, as shown in FIG. 11, is located below the pressurizing air cylinders 77 with a gap for the base 71 therebetween and is formed almost cylindrical. The ends of the manifold 79 are mounted to the underside of the lateral ends of the base 71 and are closed by a pair of brackets 71*c* extending forwardly from the base 71, as shown in FIG. 9. One end of the manifold 79 is connected with a free-coupling joint (referred to as a coupler) that passes through the bracket 71*c*. This coupler 79*a* is connected to the gelling agent tank (not shown) through a high-pressure hose and a pump (both not shown). The outer circumference of the rear part of the manifold 79 is connected with eight joints 79*bf* at their one end which are arranged at equal intervals in the lateral direction of the gel-covering apparatus 1. The other end of the joints 79*b*, as shown in FIG. 12, passes through the passages 71*d* of the base 71 and connects to the lower end of the corresponding gel passages 75*a* in the gel accommodating block 75. In this embodiment, the joints 79*b*, gel passages 75*a*, the passages 75*b* and the passages 73*n* together form a gel supply passages 73B.

The seed transfer section 9 is to transport seeds from the seed supply section 5 to the gel covering section 7 and includes, as shown in FIG. 3, a movable stage 91 supported movable on the auxiliary frame 33 so that it can be moved longitudinally of the gel-covering apparatus 1, a manifold 93 supported on the movable stage 91 so that it can be raised and lowered, eight suction tips 95 supported by the manifold 93, and a vacuum pump 97 fixedly mounted on the movable stage 91. The movable stage 91, as shown in FIG. 7, has a base plate 91*a* and a rodless magnet cylinder 91*b* for driving the base plate 91*a*.

The base plate 91*a*, as shown in FIG. 4, is virtually a rectangle in plan view which is laterally elongate spanning between the left and right sides of the auxiliary frame 33. As shown in FIG. 7, the base plate 91*a* is horizontally arranged over the auxiliary frame 33. As shown in FIG. 5, a slider 91*c* is mounted to the underside of the base plate 91*a* near the left side portion of the auxiliary frame 33. The underside of the slider 91*c* is formed with a downwardly opening guide groove 91*d*, as shown in FIG. 5, which fits over the guide rail 38 on the left sub-upper crosspiece 37. With the base plate 91*a* situated between the main upper crosspieces 36, as shown in FIG. 4, collared blocks 91*e* are mounted to the underside of the base plate 91*a* at locations facing the guide shafts 36*b*. The guide shafts 36*b* pass longitudinally through the collars of the corresponding blocks 91*e*.

The rodless magnet cylinder 91*b*, as shown in FIG. 4, extends between the support plates 36*a* of the main upper crosspieces 36 at nearly the center between the two guide shafts 36*b*. A cylinder barrel 91*f* of the rodless magnet cylinder 91*b* is arranged below the base plate 91*a* between the blocks 91*e* so that it will not interfere with the base plate 91*a* and the blocks 91*e*. The upper part of the cylinder barrel 91*f* is formed with a slit 91*h* over nearly the entire length of the cylinder barrel. In the cylinder barrel 91*f* is installed a piston yoke (not shown) that slides between the ends of the cylinder barrel 91*f* by the action of magnet.

A piston mount 91*j* that slides together with the piston yoke projects out of the slit 91*h* of the cylinder barrel 91*f*.

A bracket 91*k* extending vertically downward from the underside of the base plate 91*a* between the blocks 91*e* is secured to the piston mount 91*j* by screws 91*m*.

The manifold 93 is formed cylindrical and slightly smaller in lateral width than the seed tank 53 as shown in FIG. 5, with its ends, almost circular in cross section, closed as shown in FIG. 7. The manifold 93 is supported by the base plate 91*a* through a raise-lower mechanism 94.

The raise-lower mechanism 94, as shown in FIG. 5, includes side plates 94*a* extending vertically downward from the underside of the base plate 91*a* on the laterally inner side of each slider 91*c*; a pair of raise-lower frames 94*b* arranged on the inner side of the side plates 94*a*; a retainer plate 94*c* located below the base plate 91*a* and having its lateral ends supported by the raise-lower frames 94*b*; and an air cylinder 94*d* to raise and lower the retainer plate 94*c* relative to the base plate 91*a*.

The side plates 94*a* each have a vertically extending guide Fail 94*e* mounted on the inner side thereof and the raise-lower frames 94*b* each have a slider 94*f* secured to the outer side thereof. As shown in FIG. 4, each of the sliders 94*f* is formed at the outer side with an outwardly opening guide groove 94*g*, which fits over the guide rail 94*e* of the corresponding side plate 94*a*. The retainer plate 94*c* is formed larger in longitudinal length than the base plate 91*a* so that, with the rear end of the retainer plate 94*c* positioned at nearly the longitudinal center of the base plate 91*a*, the front end of the retainer plate 94*c* is situated in front of the base plate 91*a*. The air cylinder 94*d* is mounted on the upper surface of the base plate 91*a* at a point slightly near the front and on the left side of the block 91*e*. A cylinder rod of the air cylinder 94*d* passes through the base plate 91*a* as shown in FIG. 5 and is coupled to the upper surface of the retainer plate 94*c* near the rear end thereof through a joint rod 94*h* as shown in FIG. 4.

The manifold 93 is mounted to the front underside of the retainer plate 94*c* and has two joints 93*a* attached to the rear circumferential wall thereof at positions laterally spaced apart. The bottom circumferential wall of the manifold 93 is formed, as shown in FIG. 5, with eight holes 93*b* at laterally equal intervals corresponding to the through-holes 53*f* of the tank body portion 53*b*. The two joints 93*a*, as shown in FIG. 4, are connected through high-pressure hoses not shown to a forked joint 94*j* that is secured to the underside of the retainer plate 94*c* at a point behind the air cylinder 94*d*.

The suction tips 95, as shown in FIG. 5, are removably attached to respective holes 93*b* of the manifold 93 and are formed virtually cylindrical. The suction tips 95 each have formed in their center a suction passage (not shown) that communicates with the interior of the manifold 93. There are prepared several kinds of suction tips 95 with differing outer diameters and differing suction passage inner diameters. As in the case of the adapters 53*g* of the tank body portion 53*b*, according to the size and shape of the seeds transferred from the seed supply section 5 to the gel covering section 7, selection is made of the suction tips 95 whose outer diameter and the suction passage inner diameter are most suited for picking up and holding the seeds by suction and whose outer diameter can be inserted into the large-diameter portion 53*h* of the holes 53A of the adapters 53*g*. The selected suction tips 95 are then fitted in the holes 93*b*.

The rodless magnet cylinder 91*b* drives the manifold 93 longitudinally between a rear position and a front position by sliding its piston mount 91*j* forwardly and backwardly. With the air cylinder 94*d* of the raise-lower mechanism 94 contracted, the rear position is where the front end of each suction tip 95 is situated above the corresponding adapter 53*g* of the tank body portion 53*b*, and the front position is where the front end of each suction tip 95 is situated above the corresponding seed injection port 73*a* of the nozzle block 73.

At the rear position of the rodless magnet cylinder 91*b*, the air cylinder 94*d* of the raise-lower mechanism 94 extends its piston rod to position the front end of each suction tip 95 at a height immediately before contacting the step portion 53*k* of the corresponding adapter 53*g*, as indicated by an imaginary line of FIG. 8. At the front position of the rodless magnet cylinder 91*b*, the air cylinder 94*d* extends its piston rod to position the front end of each suction tip 95 so that it is inserted from the seed injection port 73*a* into the passage 73*v* of the plunger 73*h* fitted in the passage 73*c*.

During the extending action of the air cylinder 94*d* at the rear position of the rodless magnet cylinder 91*b*, there is a small gap between the adapter 53*g* and the suction tip 95, through which the interior of the tank body portion 53*b* communicates with the outside.

The vacuum pump 97, as shown in FIG. 5, is mounted through a seat 97*a* on the upper surface of the base plate 91*a* at a location corresponding to the blocks 91*e*. The vacuum pump 97 has a silencer 97*b* at its top. On the left side of the vacuum pump 97 on the base plate 91*a* there is mounted an air filter 99 through a manifold 98. The vacuum pump 97 is connected to the air filter 99 through a high-pressure hose not shown. The air filter 99 is connected, through a high-pressure hose not shown and the manifold 98, to a pressure sensor 97*c* which is mounted on the base plate 91*a* on the back side of the manifold 98, as shown in FIG. 4. The manifold 98 is further connected to the two joints 93*a* of the manifold 93 through high-pressure hose not shown and the forked joint 94*j*.

The gel hardening section 11 is to make the gelling agent adhering to the grainlike seeds that were processed by the gel covering section 7 react with the hardener to harden the gelling agent and thereby forming the gel-covered seeds. As shown in FIG. 3, the gel hardening section 11 comprises a hardening tank 111, a gel guide mechanism 113 and a hardening agent supply mechanism 115.

Figure 13:
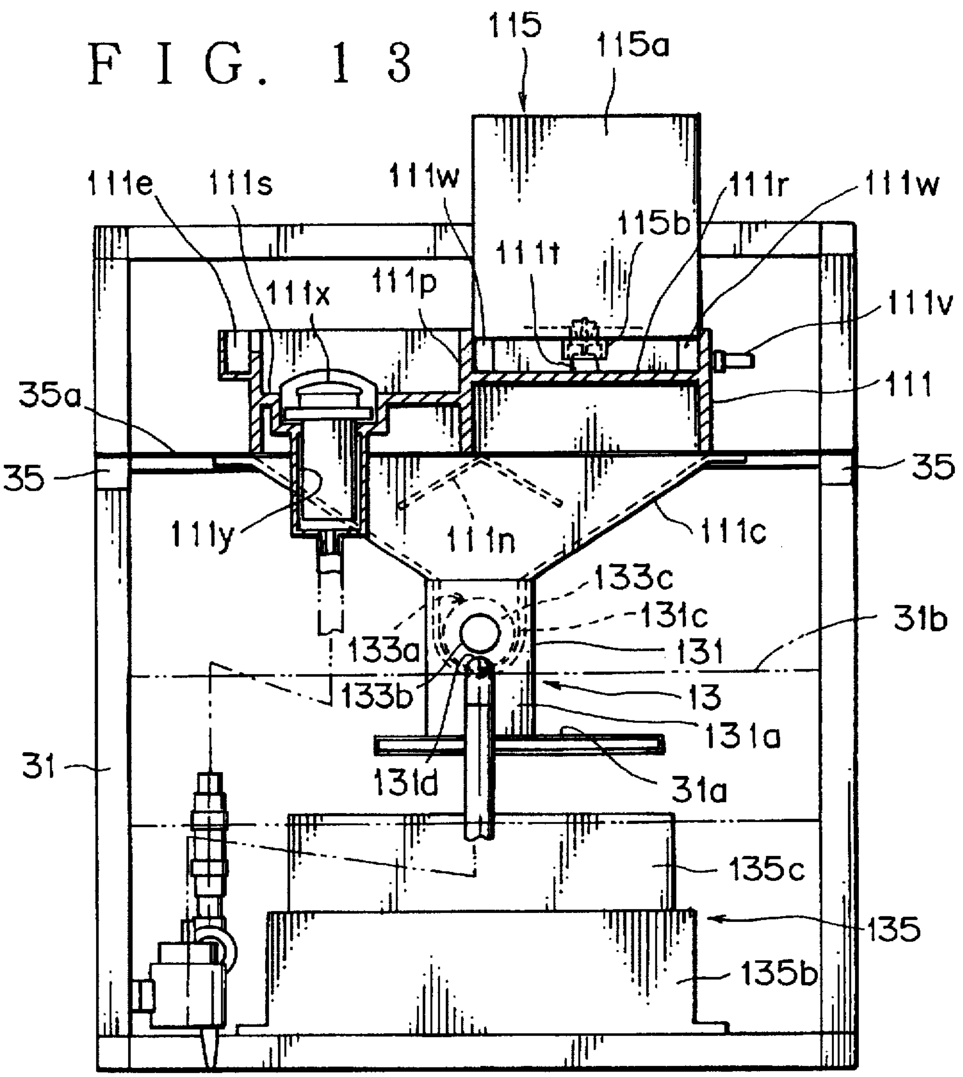
FIG. 13 is a partly cutaway, enlarged front view of a gel hardening section and a gel cleaning section shown in FIG. 1.
Figure 14:
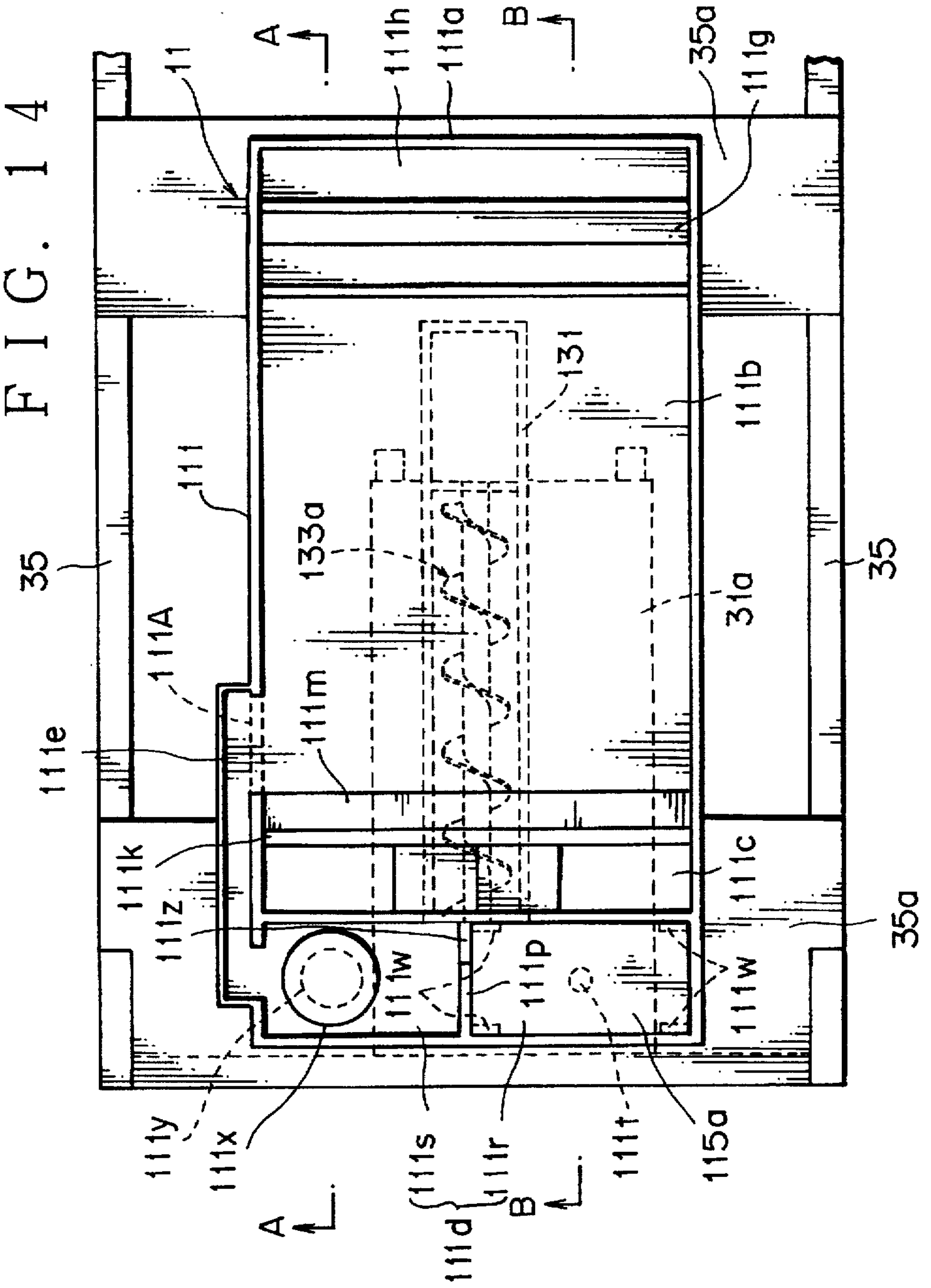
FIG. 14 is an enlarged plan view of the gel hardening section shown in FIG. 1.
Figure 15:
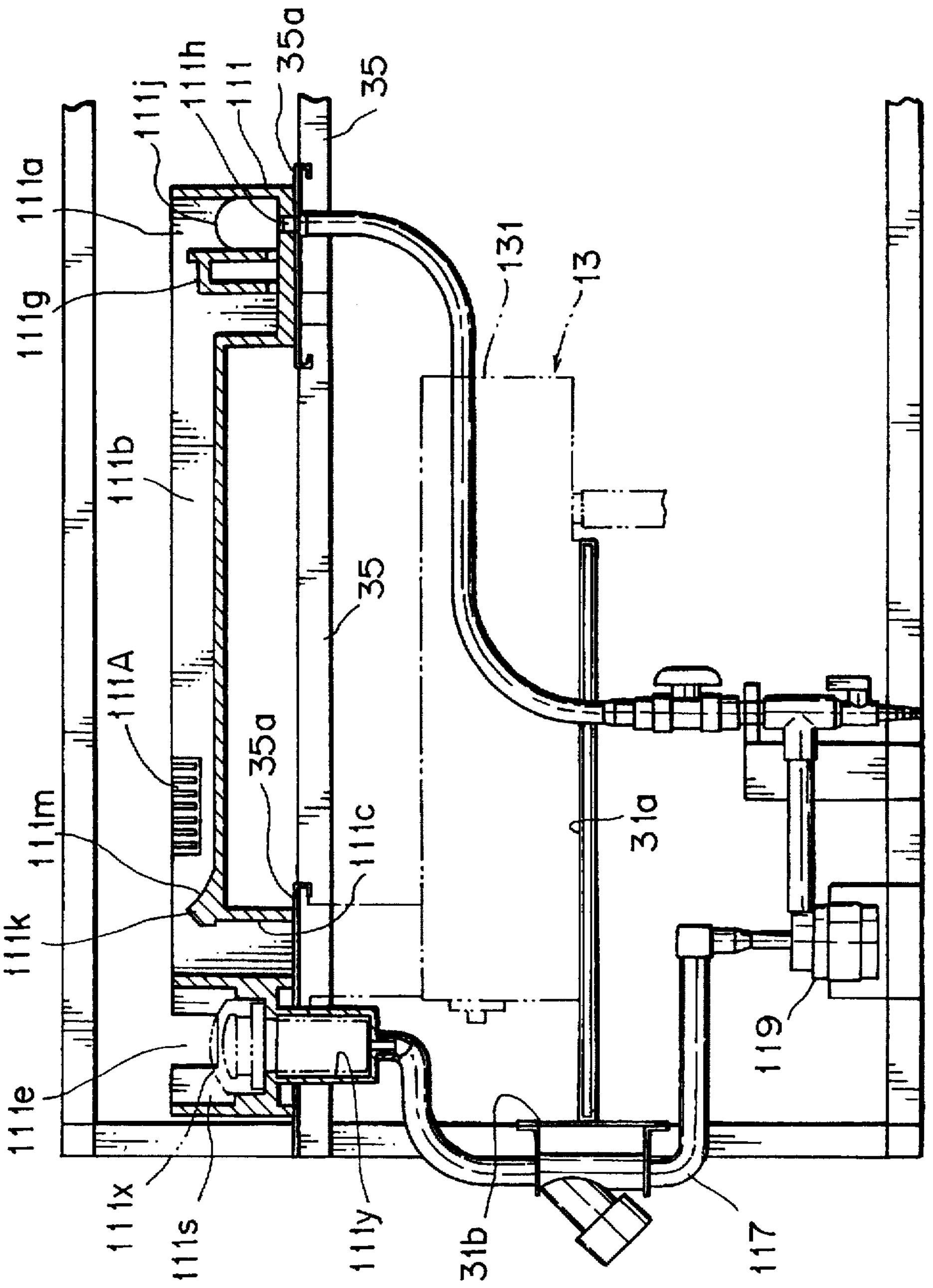
FIG. 15 is a cross section taken along the line A—A of FIG. 14.
Figure 16:
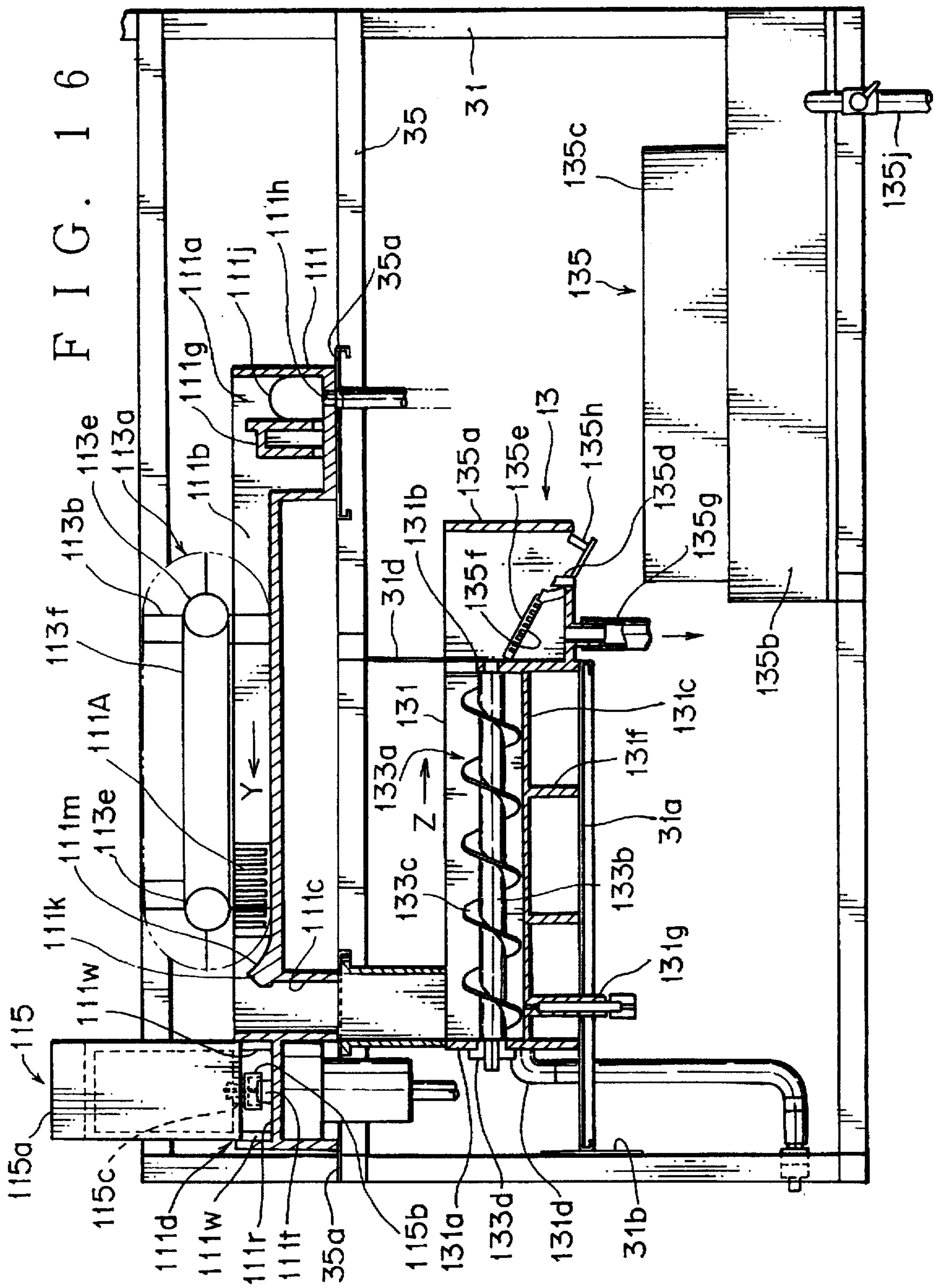
FIG. 16 is a cross section taken along the line B—B of FIG. 14

FIG. 13 is a partly cutaway enlarged front view of the gel hardening section and the gel cleaning section; FIG. 14 is an enlarged plan view of the gel hardening section; FIG. 15 is a cross section taken along the line A—A of FIG. 14; and FIG. 16 is a cross section taken along the line B—B of FIG. 14. The hardening tank 111, as shown in FIG. 14, is virtually a rectangle in plan view which is elongate in the longitudinal direction of the gel-covering apparatus 1 and is slightly wider in the lateral direction of the gel-covering apparatus 1 than the nozzle block 73 of the gel covering section 7. As shown in FIG. 14, the front and rear ends of the hardening tank 111 are supported on two longitudinally spaced thin plates 35*a* that span between the left and right sides of the lateral reinforcement frame 35 of the main frame 31.

The hardening tank 111 has a feed liquid tank 111*a*, a reaction tank 111*b*, a seed dropping port 111*c*, a waste liquid tank 111*d*, and a detour liquid passage 111*e*.

The feed liquid tank 111*a*, as shown in FIG. 14, is formed in the hardening tank 111 at the rear end of the gel-covering apparatus 1. Adjacent to the feed liquid tank 111*a* on its front side is formed the reaction tank 111*b* whose bottom is higher than the bottom of the feed liquid tank 111*a*, as shown in FIG. 15. At the longitudinally central part of the bottom of the feed liquid tank 111*a* a flow regulating barrage 111*g* is erected, as shown in FIG. 14, which is higher than the bottom of the reaction tank 111*b* and lower than the upper end of the feed liquid tank 111*a* and which spans laterally over the entire width of the hardening tank 111. The flow regulating barrage 111*g* has a hole longitudinally extending through the base thereof.

A first half of the feed liquid tank 111*a* on the front side of the flow regulating barrage 111*g*, i.e., on the side adjacent to the reaction tank 111*b*, is located below the eight valves 73*b* formed in the nozzle block 73 of the gel covering section 7. A second half of the feed liquid tank 111*a* on the rear side of the flow regulating barrage 111*g* has a feed liquid port 111*h* formed in its bottom, as shown in FIG. 16. A barrier plate 111*j*, which is made of a thin plastic plate smaller in width than the hardening tank 111 and curved convex upwardly, is accommodated in the rear half of the feed liquid tank 111*a* behind the flow regulating barrage 111*g* so that it encloses the feed liquid port 111*h*.

At the front end bottom of the reaction tank 111*b* a water stopping barrage 111*k* is formed, as shown in FIG. 15. The water stopping barrage 111*k* is shaped like a mountain peak when the gel-covering apparatus 1 is viewed from the side, and has a height higher than the flow regulating barrage 111*g* and lower than the upper end of the feed liquid tank 111*a*. The water stopping barrage 111*k* has its rear inclined surface 111m formed of an upwardly concave arc surface.

The seed dropping port 111*c* is arranged in front of the water stopping barrage 111*k* and, as shown in FIG. 13, is formed like a funnel whose lateral width progressively decreases from the top toward the bottom. This seed dropping port 111*c* forms a passage that opens to a space above the hardening tank 111 and to a space below a part of the hardening tank 111 behind that thin plate 35*a* which supports the front end side of the hardening tank 111. In the seed dropping port 111*c* there is installed a mountain-like barrier plate 111*n* whose lateral width increases downwardly from the top.

The waste liquid tank 111*d* is provided adjacent to the seed dropping port 111*c* on the front side and, as shown in FIG. 14, is divided by a laterally central partition wall 111*p* into two—a tank holder 111*r* on the right—hand side of the hardening tank 111 and a cleaning portion 111*s* on the left-hand side.

The tank holder 111*r* has its bottom higher than the bottom of the feed liquid tank 111*a* and lower than the bottom of the reaction tank 111*b*, as shown in FIG. 16. At the central part of the bottom of the tank holder 111*r* is erected a virtually cylindrical engagement projection 111*t* which is slightly lower than the upper end of the water stopping barrage 111*k*, as shown in FIG. 13 and 14. The side wall of the tank holder 111*r* is provided with an open-close valve 111*v* for draining water, as shown in FIG. 13. At four corners of the tank holder 111*r*, there are installed spacers 111*w*, as shown in FIG. 14, whose top end is almost equal in height to the top end of the water stopping barrage 111*k* as shown in FIG. 16.

The bottom of the cleaning portion 111*s* is higher than the bottom of the feed liquid tank 111*a* and slightly lower than the bottom of the tank holder 111*r*, as shown in FIG. 13. At the bottom of the cleaning portion 111*s* near the side wall a filter 111*x* is installed to remove seed grounds in the hardening agent. Below the filter 111*x* is formed a waste liquid port 111*y*. The rear part of the partition wall 111*p* near the seed dropping port 111*c* is formed with a notch 111*z* that communicates the tank holder 111*r* with the cleaning portion 111*s*, as shown in FIG. 14.

The detour liquid passage 111*e* connects the side wall area of the reaction tank 111*b* behind the water stopping barrage 111*k* on the side of the feed liquid tank 111*a* to the side wall area of the waste liquid tank 111*d*. The detour liquid passage 111*e* projects from the side of the hardening tank 111. The side wall portion of the reaction tank 111*b* to which the detour liquid passage 111*e* is connected is covered with comb teeth 111A, as shown in FIG. 15, which restrict the ingress of grainlike seed-enclosing gelling agent which falls from the valves 73*b* of the gel covering section 7.

The feed liquid port 111*h* of the feed liquid tank 111*a* and the waste liquid port 111*y* of the cleaning portion 111*s* are connected via a hose 117 and a magnet pump 119. The hose 117 upstream of the magnet pump 119 (on the waste liquid port 111*y* side) is connected with the hardening agent tank not shown through a passage changeover valve (not shown).

When the magnet pump 119 is activated with the changeover valve switched to the hardening agent tank side, the hardening agent in the hardening agent tank is supplied through the hose 117 and the feed liquid port 111*h* into the feed liquid tank 111*a*, from which the hardening agent is further supplied to the reaction tank 111*b*, the detour liquid passage 111*e*, and the tank holder 111*r*, partition wall 111*p* and cleaning portion 111*s* of the waste liquid tank 111*d*. As a result, the entire hardening tank 111 is filled with the hardening agent whose level is between the upper and lower ends of the water stopping barrage 111*k*. The hardening agent discharged from the waste liquid port 111*y* of the cleaning portion 111*s* is returned to the feed liquid tank 111*a* through the hose 117 and the feed liquid port 111*h* by activating the magnet pump 119 with the changeover valve switched to the waste liquid port 111*y* side.

The gel guide mechanism 113 has a belt conveyor 113*a*, guide paddles 113*b* circulated by the belt conveyor 113*a*, a motor 113*c* for driving the belt conveyor 113*a*, and a power transmission 113*d* for transmitting the rotation of the motor 113*c* to the belt conveyor 113*a*.

The belt conveyor 113*a* is constructed of a belt 113*f* wound around two pulleys 113*e*, as shown in FIG. 16. The pulleys 113*e* are installed above the front half of the feed liquid tank 111*a* on the reaction tank 111*b* side of the flow regulating barrage 111*g*, i.e., that portion of the feed liquid tank 111*a* into which the gelling agent is dropped from the valves 73*b* of the gel covering section 7, and also above a portion of the reaction tank 111*b* on the feed liquid tank 111*a* side of the water stopping barrage 111*k*, with their shafts directed laterally horizontally. The ends of the pulleys 113*e*, as shown in FIG. 2 and 3, are rotatably supported by front and rear end portions of two support plates 31*f* that extend longitudinally of the gel-covering apparatus 1. The front and rear ends of the two support plates 31*f* are supported on the underside of two base plates 31*e* at locations inside the main frame 31, the two base plates 31*e* spanning between the left and right sides of the main frame 31 at a longitudinally central portion and at a position slightly in front of the central portion. As shown in FIG. 1, the belt 113*f* spans laterally over the entire width of the hardening tank 111.

The guide paddles 113*b*, as shown in FIG. 16, are erected on the surface of the belt 113*f* at equal intervals in the longitudinal direction of the belt. As shown in FIG. 1, the guide paddles 113*b* are virtually rectangles in plan view which have a width corresponding to the belt 113*f* and a height sufficiently smaller than the width. The guide paddles 113*b* are, as shown in FIG. 1, formed with a number of vertical slits at laterally equal intervals extending over the entire height of the paddle.

As shown in FIG. 16, the guide paddles 113b protrude to a length such that the front ends of the guide paddles 113b on that part of the belt 113f facing the bottom of the reaction tank 111b are disposed close to the side walls and bottom of the reaction tank 111b with a small gap therebetween and that the front ends of the guide paddles 113b on that part of the belt 113f moving around the circumferential surface of the pulley 113e located above the front part of the reaction tank 111b follow the inclined surface 111m of the water stopping barrage 111k with a small gap between the paddle front ends and the inclined surface.

The motor 113c, as shown in FIG. 2, is supported on a base plate 35c spanning between the two support plates 31f situated virtually longitudinally intermediate between the two base plates 31e. The power transmission 113d includes a reduction gear mechanism 113h connected to the output shaft of the motor 113c supported on the base plate 35c, and a belt pulley mechanism 113j wound around the output shaft of the reduction gear mechanism 113h and the shaft of the pulley 113e mounted on the front part of the gel-covering apparatus 1. The belt conveyor 113a is circulated by the action of the motor 113c and power transmission 113d in such a direction that the belt 113f portion facing the hardening agent in the hardening tank 111 moves from the feed liquid tank 111a toward the waste liquid tank 111d.

The hardening agent supply mechanism 115, as shown in FIG. 13, has a reserve tank 115a and a cap 115b. The reserve tank 115a stores the highly dense hardening agent for adjusting the density of the hardening agent in the hardening tank 111. The reserve tank 115a is shaped into a vertically elongate rectangle in front view, as shown in FIG. 13. When seen in plan view, it is sized so that it can be accommodated in the tank holder 111r, as shown in FIG. 14. At the central part of the bottom of the reserve tank 115a, a tank port 115c is formed, as shown in FIG. 16, to communicate the interior with the exterior.

Figure 17:
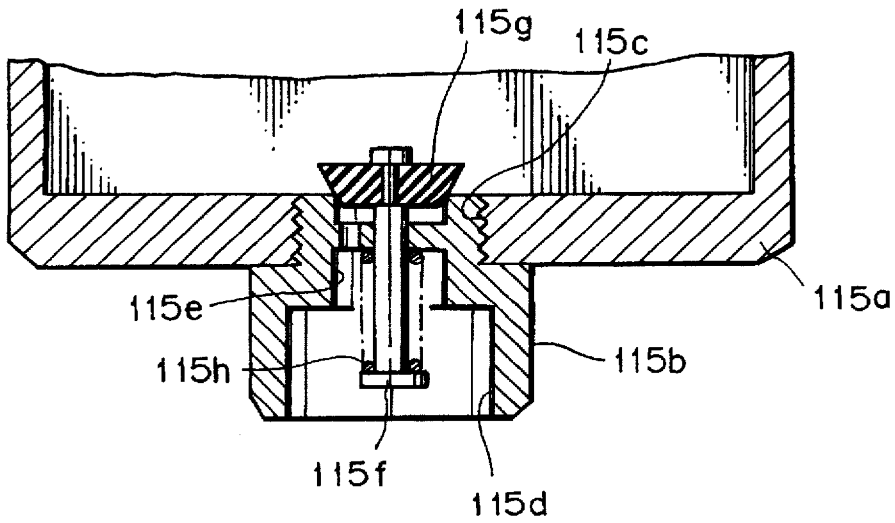
FIG. 17 is an enlarged side cross section of a cap shown in FIG. 13.

The cap 115b is screwed into the tank port 115c to close it. As shown in the enlarged side cross section of FIG. 17, it has a recess 115d that is exposed when the cap 115b is screwed into the tank port 115c. A small-diameter slide pin 115f is inserted into the central part of the bottom of the recess 115d. At a periphery of the bottom of the recess 115d through which the slide pin 115f is inserted, a through-hole 115e for communicating the inside and the outside of the cap 115b is formed.

One end of the slide pin 115f extends out into the recess 115d, with the other end situated inside the cap 115b. The inner end of the slide pin 115f is attached with a rubber plug 115g that closes the through-hole 115e. A coil spring 115h sleeved over the slide pin 115f between a flange of the slide pin 115f at the outer end and the peripheral part of the bottom of the recess 115d through which the slide pin 115f is inserted urges the slide pin 115f toward the outside of the cap 115b to close the through-hole 115e with the rubber plug 115g.

The reserve tank 115a is so constructed that when the cap 115b is screwed into the tank port 115c and the reserve tank 115a is put in the tank holder 111r with the cap 115b side down, the bottom of the recess 115d of the cap 115b is situated slightly lower than the upper end of the water stopping barrage 111k.

The gel cleaning section 18 is to wash the gel-covered seeds whose gelling agent has hardened after reacting with the hardening agent in the gel hardening section 11. As shown in FIG. 8, it includes a water cleaning tank 131, a gel guide mechanism 133, and a gel discharge mechanism 135.

Figure 18:
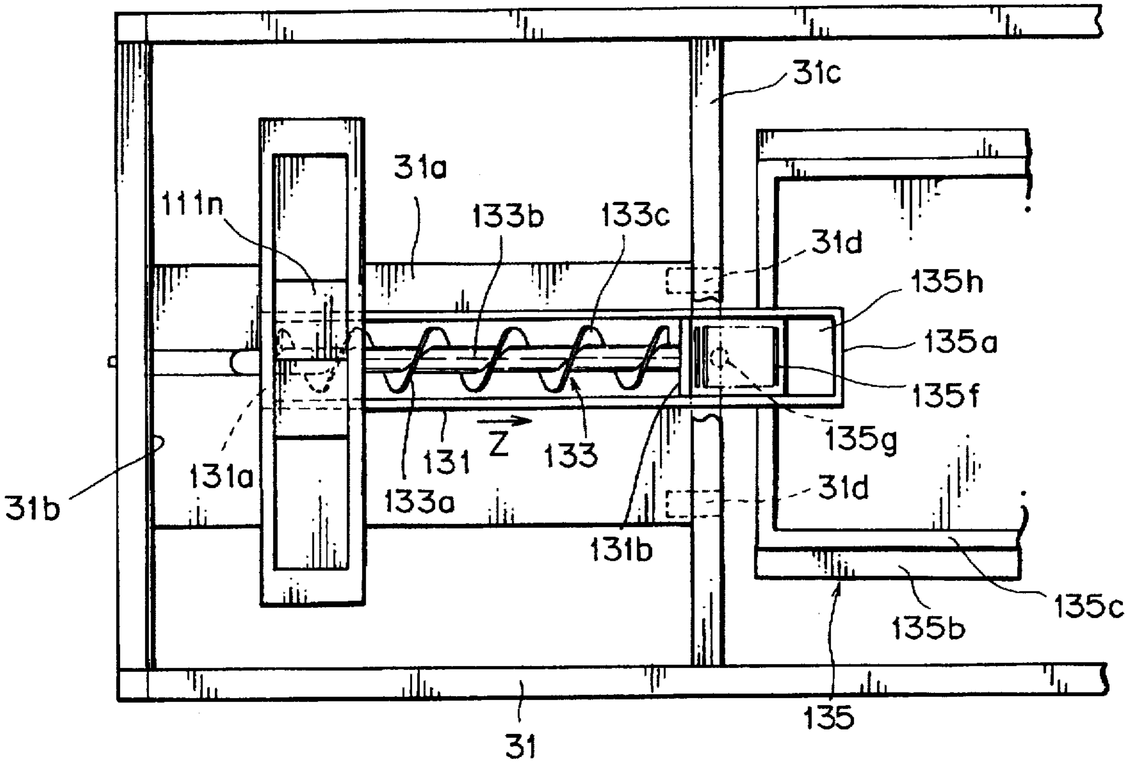
FIG. 18 is an enlarged plan view of a gel cleaning section of FIG. 1.

The water cleaning tank 131 extends from the seed dropping port 111c to the longitudinally central part of the reaction tank 111b, as shown in FIG. 16. Supported on a support plate 31a, the water cleaning tank 131 is located below the hardening tank 111 at a laterally central part of the main frame 31, as shown in FIG. 13. The support plate 31a is mounted at one end to a thin plate 31b which is horizontally disposed between left and right front portions of the main frame 31 below the lateral reinforcement frame 35. The other end of the support plate 31a is mounted at its left and right side to the lower ends of two thin plates 31d that are suspended from laterally spaced portions of a reinforcement frame 31c spanning between the left and right upper portions of the main frame 31, as shown in FIG. 16 and in FIG. 18 representing the enlarged plan view of the gel cleaning section.

Figure 19:
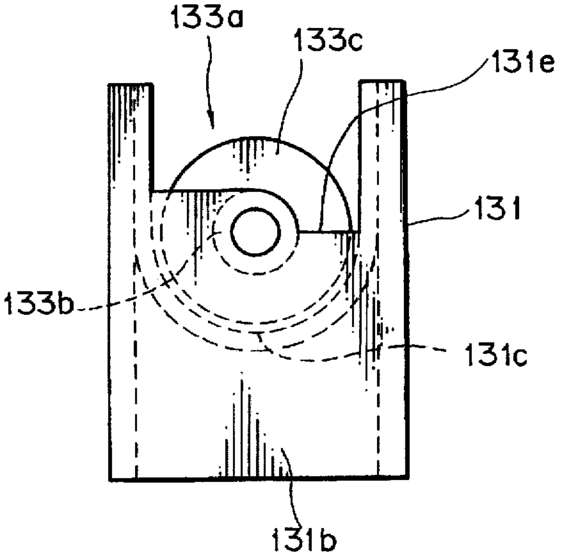
FIG. 19 is an enlarged rear view of a rear plate of a cleaning tank shown in FIG. 18.

The water cleaning tank 131 has a vertically open outer frame, which is virtually rectangular in plan view, and also a body plate 131c which is accommodated in the outer frame and extends from a front plate 131a to a rear plate 131b. The water cleaning tank 131 stores cleaning water for cleaning the gel-covered seeds after the gelling agent adhering to the seeds are hardened. The front plate 131a, as shown in FIG. 13, is a vertically elongate rectangle in front view and, at a vertically central part, is formed with a water supply port 131d that communicates with the interior of the water cleaning tank 131. The rear plate 131b, as shown in the enlarged rear view of FIG. 19, has a roughly reverse L-shaped notch 131e in the upper half thereof. The body plate 131c, when seen from the front, is shaped like a letter U and upwardly open with the lower part bent in semicircle. Between the outer surface of the body plate 131c and the support plate 31a there are installed reinforcement plates 131f at longitudinally spaced locations, as shown in FIG. 16. Denoted 131g in FIG. 16 is a plug for draining the cleaning water which is attached to a bottom of the body plate 131c near the front plate 131a.

The gel guide mechanism 133 has a screw feeder 133a and a motor (not shown) for driving the screw feeder 133a. The screw feeder 133a, as shown in FIG. 18, has a shaft 133b and a spiral blade 133c. The shaft 133b extends along the center of the curvature of the lower part of the body plate 131c and its ends are rotatably supported by the front plate 131a and the rear plate 131b. The spiral blade 133c is secured to the outer circumference of the shaft 133b between the front plate 131a and the rear plate 131b. The motor not shown is connected to the shaft 133b through a gear 133d—which is secured to that part of the shaft 133b passing through the front plate 131a and extending forwardly from the water cleaning tank 131—and through a reduction gear train not shown in mesh with the gear 133d. The screw feeder 133a rotates in a direction that will move the gel-covered seeds in the cleaning water in the water cleaning tank 131 from the front plate 131a toward the rear plate 131b by the action of the motor, reduction rear train and gear 133d.

The gel discharge mechanism 135 has a water separating box 135a, a water discharge pan 135b, and a seed receiving cage 135c. The water separating box 135a is formed adjacent to and on the back side of the rear plate 131b and is virtually a rectangle in plan view having a predetermined length in the longitudinal direction. The water separating box 135a is open upward and, as shown in FIG. 18, has a lateral width corresponding to that of the water cleaning tank 131.

At a longitudinally central part of the bottom of the water separating box 135a is erected an engagement wall 135d, as shown in FIG. 16. Between the upper end of the engagement wall 135*d* and the lower end of the notch 131*e* of the rear surface of the rear plate 131*b* there is installed a water separating plate 135*e* which inclines downwardly from the rear plate 131*b* toward the engagement wall 135*d*. The lower end of the water separating plate 135*e* is locked to a corner of the engagement wall 135*d* on the rear plate 131*b* side.

Between the upper end of the engagement wall 135*d* and the rear plate 131*b* the water separating plate 135*e* is as wide in the lateral direction as the water separating box 135*a* and is formed with a number of laterally elongate slits 135*f* that are longitudinally spaced from one another. These slits 135*f* prevent the passage of the gel-covered seeds from the water cleaning tank 131 while at the same time allowing the water to pass through.

In the bottom of the water separating box 135*a* on the rear plate 131*b* side of the engagement wall 135*d*, a water discharge port 135*g* is formed, as shown in FIG. 16, to discharge water that has passed through the slits 135*f* of the water separating plate 135*e*. The bottom of the water separating box 135*a* on the rear side of the engagement wall 135*d*, i.e., on the side opposite the water discharge port 135*g*, is formed with a seed discharge port 135*h* that can be opened and closed.

The water discharge pan 135*b* is shaped like a flat rectangular dish that opens upward. The water discharge pan 135*b* extends longitudinally from below the water separating box 135*a* to the rear end of the main frame 31 and has a lateral width smaller than the main frame 31. The front and rear ends of the water discharge pan 135*b* are supported on the left and right lower portions of the main frame 31 at the rear end and longitudinally central part of the main frame 31. The bottom of the water discharge pan 135*b* is formed with a water discharge port (not shown), which communicates to a discharge valve 135*j* installed at the right-hand side of the water discharge pan 135*b*. The seed receiving cage 135*c* is virtually rectangular in plan view and open upwardly and is formed of a mesh that prevents passage of the gel-covered seeds. The seed receiving cage 135*c* is so shaped and sized that it can be installed inside the water discharge pan 135*b*.

Next, the operation of the gel-covering apparatus 1 of this embodiment with the above construction will be explained.

In starting the process of covering seeds with gel, one of the several kinds of adapters 53*g* whose inner diameter of the small-diameter portion 53*j* is most suited to the kind or size of the seeds to be processed is selected and mounted to the eight through-holes 53*f* of the tank body portion 53*b* in the seed tank 53.

Among the several kinds of plungers 73*h*, one is selected whose outer diameter of the small-diameter portion 73*k* is most suited to the size of the seeds to be processed. The selected plunger is installed in the eight passages 73*c* of the nozzle block 73 in the gel covering section 7 and the coil spring 73*r* is fitted in each of the passages 73*c*, into which the caps 73*s* are then screwed. Further, from several kinds of suction tips 95, one is selected whose outer diameter and the suction passage inner diameter are most suited to the size of the seeds to be processed and which can be inserted into the large-diameter portion 53*h* of the hole 53A of the adapter 53*g*. The selected suction tip 95 is installed in each of the eight holes 93*b* of the manifold 93 in the seed transfer section 9.

Next, the power switch, not shown, of the gel-covering apparatus 1 is turned on to contract the pressurizing air cylinders 77 of the gel accommodating block 75. The air cylinder 94*d* of the raise-lower mechanism 94 is also contracted to raise the retainer plate 94*c* to the base plate 91*a* side. At the same time, the rodless magnet cylinder 91*b* is operated to slide the piston mount 91*j* backward to move the manifold 93 to the rear position.

Further, the turn-on of the power switch activates the vacuum pump 97 to start drawing air from the suction passages of the suction tips 95 through the manifold 93, joints 93*a*, 94*j* and high-pressure hose not shown. At this time, because air is drawn from the suction tips 95 through the manifold 93 installed between the vacuum pump 97 and the suction tips 95, the suction pressures produced at the suction tips 95 are equal.

With the changeover valve switched to the hardening agent tank side, turning on the power switch causes the magnet pump 119 to supply the hardening agent from the hardening agent tank to the hardening tank 111. At this time, the hardening agent that have entered through the feed liquid port 111*h* into the rear half of the feed liquid tank 111*a* flows over the flow regulating barrage 111*g* or through the opening at the base of the barrage into the front half of the feed liquid tank 111*a* and further into the reaction tank 111*b*, thus filling the entire hardening tank 111.

The magnet pump 119 is temporarily stopped when the amount of hardening agent from the hardening agent tank reaches a certain volume such that the liquid level in the hardening tank 111 becomes equal to a predetermined level between the upper and lower end of the water stopping barrage 111*k*. After the changeover valve is switched to the waste liquid port 111*y* side, the magnet pump 119 is restarted. Hence, after the predetermined amount of hardening agent is supplied from the hardening agent tank to the hardening tank 111, the hardening agent discharged from the waste liquid port 111*y* of the cleaning portion 111*s* is returned through the hose and the feed liquid port 111*h* into the feed liquid tank 111*a*.

When the hardening agent supplied from the hardening agent tank fills the whole hardening tank 111 or when the hardening agent is returned from the waste liquid port 111*y* of the cleaning portion 111*s* through the hose 117 and feed liquid port 111*h* into the feed liquid tank 111*a*, the hardening agent flows over or under the flow regulating barrage 111*g* into the reaction tank 111*b*, creating a flow of hardening agent in the hardening tank 111 that runs from the feed liquid tank 111*a* to the reaction tank 111*b* and the detour liquid passage 111*e* to the tank holder 111*r* and cleaning portion 111*s* of the waste liquid tank 111*d*.

Next, after the predetermined amount of hardening agent supplied from the hardening agent tank raises the liquid level of the hardening tank 111 to a predetermined level between the upper and lower ends of the water stopping barrage 111*k*, the reserve tank 115*a* is placed into the tank holder 111*r* with the cap 115*b* facing down. As a result, the engagement projection 111*t* of the tank holder 111*r* is inserted into the recess 115*d* of the cap 115*b* and its front end engages the slide pin 115*f* pushing the slide pin 115*f* into the cap 115*b* against the force of the coil spring, which in turn causes the rubber plug 115*g* to part from the through-hole 115*e* of the cap 115*b*, forming a gap between the through-hole 115*e* and the circumferential surface of the slide pin 115*f*.

At this time, because the position of the through-hole 115*e* of the cap 115*b* opened by the parting rubber plug 115*g* is slightly higher than the front end of the slide pin 115*f* pushed in by the engagement projection 111*t* and because the level of the hardening agent in the hardening tank 111 has reached the predetermined level between the upper and lower end of the water stopping barrage 111*k*, the high-density hardening agent in the reserve tank 115*a* will not flow out to the hardening tank 111 with the current liquid level of the hardening agent.

Next, the motor 113*c* of the gel guide mechanism 113 in the gel hardening section 11 is turned on to start circulating the belt conveyor 113*a* along the flow of the hardening agent in the hardening tank 111. A motor not shown in the gel cleaning section 13 is operated to rotate the screw feeder 133*a* to cause the cleaning water in the water cleaning tank 131 to flow from the front plate 131*a* side toward the rear plate 131*b* side and to slightly overflow the notch 131*e* of the rear plate 131*b*. As a result, in the water cleaning tank 131 the gel-covered seeds are transported from the front plate 131*a* side toward the rear plate 131*b* side. The cleaning water that has overflowed from the notch 131*e* of the rear plate 131*b* enters into the water separating box 135*a* where it passes through the slits 135*f* into the water discharge port 135*g*, from which it is discharged out of the water cleaning tank 131. The cleaning water is further returned through the water supply port 131*d* into the water cleaning tank 131.

Further, when the power is turned on, a compressor not shown applies a positive pressure to the gelling agent tank to deliver the gelling agent from the gelling agent tank through the high-pressure hose, pump and rubber tube joint 79*a* to the manifold 79 to fill the manifold 79 with the gelling agent. The gelling agent filled in the manifold 79 is further moved under pressure to the eight joints 79*b* and, from the lower end side, to the corresponding gel passages 75*a* of the gel accommodating block 75. Because the manifold 79 is interposed between the gelling agent tank and the gel accommodating block 75 and because the gelling agent is supplied to the respective gel passages 75*a* of the gel accommodating block 75 through this manifold 79, the gelling agent supply pressures for the gel passages 75*a* are equal, assuring the supply of the constant, same amount of gelling agent to each gel passage 75*a* according to their capacity.

When the gelling agent is supplied to the gel passages 75*a*, the air vent valves 78 are opened to vent air from the upper part of the gel passages 75*a*—into which the gelling agent was supplied from the lower end side—to ensure that the gelling agent fills the gel passages 75*a* without a gap. From the gel passages 75*a*, the gelling agent is further supplied under pressure through the passages 75*b* and the passages 73*n* into the corresponding spaces 73*m* of the passages 73*c* in the nozzle block 73 until the spaces 73*m* are filled with the gelling agent without a gap, at which time the air vent valves 78 are closed. When the gelling agent is supplied to the gel passages 75*a*, the backflow of the gelling agent from the gel passages 75*a* to the manifold 79 side is prevented by the check valves 75*d* at the lower ends of the get passages 75*a*.

Under this condition, the pressurizing air cylinders 77 are extended to pressurize the gel passages 75*a* to increase the pressure in the spaces 73*m* through the passages 75*b*, 73*n* filled with the gelling agent. This causes the plungers 73*h* to move up the passages 73*c* against the force of the coil springs 73*r*, opening the valves 73*b* that were closed by the lower ends of the small-diameter portions 73*k*, with the result that the predetermined amounts of the gelling agent filled in the spaces 73*m* are pushed out of the valves 73*b* and fall from the nozzle block 73 in the form of grainlike drops.

When the pressurizing air cylinders 77 are contracted at the same time that the drops of gelling agent fall from the valves 73*b*, the pressures in the spaces 73*m* decrease, accelerated by the reduction in the amount of the gelling agent in the spaces 73*m* caused by the dropping gelling agent from the valves 73*b*, until the force of the coil springs 73*r* overcomes the pressure in the spaces 73*m* causing the plungers 73*h* to move down the passages 73*c* to close the valves 73*b* with the lower ends of the small-diameter portions 73*k*. As the valves 73*b* close, the gelling agent adhering to the valves 73*b* and the lower ends of the small-diameter portions 73*k* forms a film at the lower ends of the small-diameter portions 73*k*. To the extent that the gelling agent decreases in volume because of the dropping gelling agent from the valves 73*b*, the gel passages 75*a* are replenished with the gelling agent from the gelling agent tank through the manifold 79.

Next, the seeds to be processed are thrown into the hopper portion 53*c* of the seed tank 53 in the seed supply section 5. The seeds thrown in roll and slide down an inclined portion of the rear plate 53*v* and enter through the slit 53*e* into the tank body portion 53*b*.

The amount of seeds that pass through the slit 53*e* is limited to a specified amount determined by the vertical height H1 of the slit 53*e* and thus the amount of seeds in the tank body portion 53*b* is kept almost constant regardless of the amount of seeds thrown into the hopper portion 53*c*. The limitation of the amount of seeds supplied from the hopper portion 53*c* into the tank body portion 53*b* also involves, to some extent, the distance H3 from the bottom circumferential surface of the tank body portion 53*b* to the air chamber 53*m*.

After the seeds are accommodated into the tank body portion 53*b*, the air compressor not shown is operated to supply compressed air through the manifold 53*r* to the air chamber 53*m*, from which the compressed air blows out through the blowout ports 53*n*, creating an air flow in the tank body portion 53*b* circulating from the bottom of the tank body portion 53*b* to the front end to the top to the rear end, thus agitating the seeds in the tank body portion 53*b*.

In this embodiment, because the manifold 53*r* is disposed between the air compressor and the air chamber 53*m* and the compressed air is supplied to the blowout ports 53*n* through this manifold 53*r*, the blowout pressures of the compressed air at the blowout ports 53*n* are equal. Further, in this embodiment, the amount of seeds agitated in the tank body portion 53*b* is determined by the amount of seeds that pass between the air chamber 53*m* and the bottom inner circumferential surface of the tank body portion 53*b* and which are further carried from the bottom of the tank body portion 53*b* toward the front end by the air flow circulating from the bottom of the tank body portion 53*b* to the front end to the top to the rear end. In other words, the amount of seeds agitated is determined by the vertical distance between the air chamber 53*m* and the bottom inner circumferential surface of the tank body portion 53*b*.

Then, with the manifold 98 left at the rear position, the air cylinder 94*d* of the raise-lower mechanism 94 is extended to lower the retainer plate 94*c* away from the base plate 91*a* to position the front end of each suction tip 95 at a height just short of contacting the step portion 53*k* of the corresponding adapter 53*g*. As the seeds being agitated in the tank body portion 53*b* come near the through-holes 58*f*, they are picked up and held by the through-holes 53*f* by suction.

After a specified length of time elapses from the extension of the air cylinder 94*d*, the pressure sensor 97*c* measures the air pressure in the manifold 98. When the air pressure is found to exceed the predetermined pressure, it is decided that the suction pressure of at least a part of the suction tips 95 has not yet lowered to the suction pressure for holding the seeds and that not all the suction tips 95 are holding the seeds. Based on this decision, air evacuation by the vacuum pump 97 is stopped and the air cylinder 94d is contracted to raise the retainer plate 94c toward the base plate 91a to the original position. After the air cylinder 94d is contracted, the vacuum pump 97 is restarted.

Then, when the air pressure in the manifold 98 measured by the pressure sensor 97c is found to be lower than the predetermined pressure, the vacuum pump 97 is not stopped and, with all the suction tips 95 holding the seeds by suction, the air cylinder 94d is contracted to raise the retainer plate 94c toward the base plate 91a.

While the suction tips 95 hold the seeds by suction, the interior and the exterior of the tank body portion 53b communicate with each other through a small clearance between the front end of each suction tips 95 and the adapter 53g, so that a part of the air flow created in the tank body portion 53b by the compressed air blowing out of the blowout ports 53n escapes out of the tank body portion 53b through the small clearance between the front end of each suction tips 95 and the hole 53A of the adapter 53g. Hence, a part of the seeds being agitated in the tank body portion 53b is carried by the escaping part air flow to near the hole 53A of the adapter 53g.

Further, while the suction tips 95 hold the seeds by suction, the air flow created by the blowing compressed air from the blowout ports 53n circulates not only the seeds but also dust—such as seed grounds produced when the seeds contact the inner wall of the tank body portion 53b and dust entering the tank body portion 53b through the adapters 53g—in the tank body portion 53b, raising the possibility of such dust being sucked into the suction tips 95. However, the air filter 99 installed adjacent to the vacuum pump 97 removes the dust drawn into the suction tips 95 and thereby cleans air, thus preventing the clogging of the suction tips 95 and overheating of the vacuum pump 97 due to overload.

In replacing the adapters 53g in the seed supply section 5 of maintaining the seed tank 53, the user need only to hold the grip 51d and move the slide plate 51c along the guide grooves 51b of the guide rails 51a to pull the seed tank 53 to the right and take it out of the main frame 31. This allows the maintenance to be performed without being interfered with by the seed transfer section 9 at the upper part of the seed supply section 5.

Then, with the suction tips 95 holding the seeds by suction, the air cylinder 94d is contracted to raise the retainer plate 94c toward the base plate 91a, followed by the rodless magnet cylinder 91b being operated to slide the piston mount 91j forwardly to move the manifold 93 to the front position. Next, the air cylinder 94d is extended to lower the retainer plate 94c away from the base plate 91a to position the front end of each suction tip 95 so that it is inserted from the seed injection port 73a of the corresponding nozzle block 73 into the passage 73v of the plunger 73h in the passage 73c. After this, the drawing of air by the vacuum pump 97 is stopped to deactivate the suction tips 95 that are holding seeds by suction and a positive pressure is applied to the suction tips 95 to drop the seeds from the suction tips 95 into the passages 73v of the plungers 73h.

The operation of the vacuum pump 97 is stopped to drop the seeds that were held by the suction tips 95 into the passages 73v of the plungers 73h. After this, the air cylinder 94d is contracted to raise the retainer plate 94c toward the base plate 91a. Then the rodless magnet cylinder 91b is operated to slide the piston mount 91j rearward to return the manifold 93 to the original rear position.

As can be seen from the above description, the direction in plan view in which the seed transfer section 9 transfers the seeds from the seed supply section 5 to the gel covering section 7, i.e., the horizontal component of the transfer direction, is indicated by the arrow X in FIG. 4 and 7.

As described above, when the seeds held by the suction tips 95 are dropped into the plungers 73h, the seeds rest on the film of gelling agent formed at the lower ends of the small-diameter portions 73k of the plungers 73h. In synchronism with this process, the pressurizing air cylinders 77 are extended to increase the pressure in the spaces 73m through the gel passages 75a and passages 75b, 73n, causing the plungers 73h to move up, opening the valves 73b. As a result, a predetermined amount of the gelling agent in the spaces 73m is pushed down out of the nozzle block 73 through the valves 73b by the internal pressure of the spaces 73m, contacting the gelling agent films formed at the lower ends of the small-diameter portions 73k on which the seeds are resting. The seeds are thus enclosed by the gelling agent and then fall as grainlike covered seeds through the holes 74a, 71d of the base frame 74 and base 71 into the hardening tank 111 below the base 71.

At this time, the backflow of the gelling agent from the gel accommodating block 75 to the manifold 79 side is prevented by the check valves 75d.

Then, the pressurizing air cylinders 77 are contracted to lower the plungers 73h closing the valves 73b and forming the gelling agent films at the lower ends of the small-diameter portions 73k. At the same time, the gelling agent of an amount corresponding to that which was pushed out of the valves 73b to cover the seeds is supplied under pressure from the gelling agent tank through the manifold 79 to the gel passages 75a.

The above-mentioned operation of the seed supply section 5, gel covering section 7 and seed transfer section 9 is performed by controlling a sequencer not shown. By repeating this sequence of operation, eight grainlike covered seeds enclosed by gelling agent are produced simultaneously in one process. The eight covered seeds are dropped into the front half of the feed liquid tank 111a on the reaction tank 111b side of the flow regulating barrage 111g in the hardening tank 111 disposed below the base 71 and enter into the hardening agent.

When the covered seeds fall into the front half of the feed liquid tank 111a of the hardening tank 111 on the reaction tank 111b side of the flow regulating barrage 111g and enter into the hardening agent, they are carried by the flow in the hardening tank 111 and transferred through the hardening agent to the reaction tank 111b, where they are moved slightly forward before being pushed toward the water stopping barrage 111k by the guide paddles 113b immersed in the hardening agent as the belt conveyor 113a is circulated.

During this time, the hardening agent in the reaction tank 111b escapes through the slits 113g or through small clearances between the guide paddles 113b and the side wall and bottom surface of the reaction tank 111b into the feed liquid tank 111a side of the guide paddles 113b as the immersed guide paddles 113b are driven. Hence, the movement of the guide paddles 113b through the hardening agent neither disturbs the flow of the hardening agent greatly nor causes the hardening agent to flow out of the hardening tank 111 or to flow over the water stopping barrage 111k into the seed dropping port 111c.

Then, when the covered seeds in the hardening agent are guided by the guide paddles 113b to a point in the reaction tank **111*b* immediately behind the water stopping barrage 111*k*, the front ends of the guide paddles 113*b* move upward following the inclined surface 111*m* of the water stopping barrage 111*k* with a small gap therebetween as the belt 113*f* circulates along the circumferential surface of the upper pulley 113*e*. As the guide paddles 113*b* turn upward, the covered seeds in the hardening agent are pushed by the guide paddles 113*b* and ride on the inclined surface 111*m* of the water stopping barrage 111*k*. Just when the front ends of the guide paddles 113*b* reach the height of the apex of the water stopping barrage 111*k*, the covered seeds roll onto the front surface of the water stopping barrage 111*k* opposite the inclined surface 111*m* and fall into the seed dropping port 111*c***.

Until they are thrown into the seed dropping port **111*c*, the covered seeds that have dropped out of the valves 73*b* of the plunger 73*h* in the nozzle block 73 are immersed in the hardening agent for a specified time to turn the gelling agent enclosing the seeds into gel through reaction of the gelling agent with the hardener, thus making gel-covered seeds. Because the left and right inner walls of the seed dropping port 111*c* and the barrier plate 111*n* are inclined, the gel-covered seeds, even if some hardening agent adheres to them, will reliably fall into the water cleaning tank 131 near the front plate 131*a* arranged below the seed dropping port 111*c***.

As can be seen from the above, the direction in which the gel guide mechanism 113 of the gel hardening section 11 guides the covered seeds from the feed liquid tank **111*a* over the water stopping barrage 111*k* into the seed dropping port 111*c* in the hardening tank 111, i.e., the horizontal direction of the guiding, is represented by the arrow Y in FIG. 16**.

When the hardening agent decreases in density and amount as the grainlike covered seeds that have fallen off the valves **73*b* of the plunger 73*h* of the nozzle block 73 are immersed in the hardening agent for a specified period of time to react with it and harden, the liquid level of the hardening agent in the hardening tank 111 goes below the predetermined level—which is between the upper and lower ends of the water stopping barrage 111*k*—and becomes lower than the through-hole 115*e* of the cap 115*b* that is opened by the lifted rubber plug 115*g*. As a result, the high-density hardening agent in the reserve tank 115*a* flows out through a gap between the circumferential surface of the slide pin 115*f* pushed in by the engagement projection 111*t* of the tank holder 111*r* and the through-hole 115*e* of the cap 115*b* and enters into the tank holder 111*r*, where it mixes with the spent hardening agent removed of the hardened, covered seeds which has flowed from the reaction tank 111*b* through the detour liquid passage 111*e* into the tank holder 111*r***.

Then, when the supply of the high-density hardening agent from the reserve tank **115*a* raises the density of the hardening agent in the hardening tank 111 and recovers the hardening agent level to the specified position, the hardening agent level becomes higher than the position of the through-hole 115*e* of the cap 115*b* opened by the lifted rubber plug 115*g*, stopping the inflow of the hardening agent into the hardening tank 111. In this way, the level of the hardening agent in the hardening tank 111 is always kept at the specified position between the upper and lower ends of the water stopping barrage 111*k*** and the density of the hardening agent at an appropriate level for hardening the covered seeds.

The gel-covered seeds that have fallen into the water cleaning tank 131 near the front plate **131*a* are guided toward the rear plate 131*b* by a water flow in the water cleaning tank 131—created by the screw feeder 133*a* driven by a motor not shown and running from the front plate 131*a* toward the rear plate 131*b*—and also by the apparent motion of the submerged part of the spiral blade 133*c* from the front plate 131*a* toward the rear plate 131*b* as the screw feeder 133*a*** rotates.

When the gel-covered seeds arrive at a point immediately before the rear plate **131*b*, they are scooped up with the spiral blade 133*c* on the rear plate 131*b* side that is moving up from within the cleaning water as the screw feeder 133*a*** turns.

As explained above, until the gel-covered seeds are scooped up by the spiral blade **133*c* from within the cleaning water, the gel-covered seeds that have fallen from the seed dropping port 111*c* of the hardening tank 111 into the water cleaning tank 131 near the front plate 131*a* are immersed in the cleaning water and cleaned with it while being moved through the cleaning water for a predetermined duration of time. Because the spiral blade 133*c* that has scooped up the gel-covered seeds as the screw feeder 133*a* rotates inclines downwardly toward the rear plate 131*b*, the cleaned gel-covered seeds roll along the inclined spiral blade 133*c*, passing over the lower end of the notch 131*e* of the rear plate 131*b* onto the water separating plate 135*e***.

After they have moved out of the tank body portion **53*b* of the seed tank 53 until they are thrown into the seed dropping port 111*c* of the hardening tank 111, the eight seeds or the grains of gelling agent enclosing the seeds are arranged in a lateral line in the gel-covering apparatus 1 and transferred, moved and processed parallelly. Because the seed dropping port 111*c* has a downwardly decreasing lateral width, the grains of gelling agent thrown into the seed dropping port 111*c* collect into a group so that in the gel cleaning section 13** the eight grains are cleaned as one group.

Some cleaning water scooped up together with the gel-covered seeds onto the water separating plate **135*e* by the spiral blade 133*c* as well as the cleaning water adhering to the gel-covered seeds is left to pass through the slits 135*f* and flow out of the water separating box 135*a* through the water discharge port 135*g*. The gel-covered seeds thrown onto the water separating plate 135*e* and cleared of water roll down the inclined water separating plate 135*e* and are discharged from the water separating box 135*a* through the seed discharge port 135*h* into the seed receiving cage 135*c*. Then, in the seed receiving cage 135*c* the cleaning water adhering to the gel-covered seeds is allowed to fall by its own weight through the mesh of the seed receiving cage 135*c* and onto the bottom of the water discharge pan 135*b*, from which it is drained through the discharge valve 135*j*** of the discharge port.

As can be seen from the above description, the direction in plan view in which the gel guide mechanism 133 of the gel cleaning section 13 guides the gel-covered seeds through the cleaning water in the water cleaning tank 131 from the front plate **131*a* to the notch 131*e* of the rear plate 131*b*, i.e., the horizontal component of the guiding direction, is represented by the arrow Z of FIG. 16 and 18**.

In summary, the gel-covering apparatus 1 of this invention is operated as follows. The gelling agent filled in the manifold 79 of the gel covering section 7 is supplied through the eight gel supply passages 73B into the spaces **73*m* formed between the eight passages 73*c* and the plungers 73*h*, each of the eight gel supply passages 73B comprising the joint 79*b*, gel passage 75*a*, passage 75*b* and passage 73*n***.

The valves 73*b* at the lower ends of the passages 73*c* are opened and seeds to be processed are thrown from above into the passages 73*v* of the plungers 73*h* to rest on the gelling agent films formed at the lower ends of the passages 73*c*. At the same time, the eight pressurizing air cylinders 77 corresponding to the gel supply passages 73B are extended to pressurize the gelling agent in the spaces 73*m* through the gel passages 75*a* to raise the plungers 73*h* in the passages 73*c*, opening the valves 73*b* at the lower ends of the passages 73*c*. As a result, the gelling agent is discharged down from plungers 73*h* through the open valves 73*b*, enclosing the seeds resting on the gelling agent films formed at the lower ends of the passages 73*c* to form grainlike covered seeds.

Because the gelling agent filling pressure in the manifold 79 is constant, the amounts of gelling agent supplied from the manifold 79 and filled into the spaces 73*m* of the eight passages 73*c* in the nozzle block 73 through the eight gel supply passages 73B are equal. Hence, the amounts of gelling agent that drop from the passages 73*c* when the valves 73*b* are opened by pressurizing the gelling agent in the spaces 73*m* by the air cylinders 77 are equal, thereby making uniform the grain sizes of the covered seeds formed in each passage 73*c* and also the amount of gelling agent used.

In the gel-covering apparatus 1 of this embodiment, the air vent valves 78 are connected to the upper ends 75*f* of the gel passage portions 75*e*—disposed in the eight gel supply passages 73B above the passages 75*b* branching from the gel passages 75*a*—and are opened and closed to communicate the gel passage portions 75*e* with the outside of the gel accommodating block 75, the gel supply passages 73B communicating the manifold 79 with the spaces 73*m* in the eight passages 73*c* in the nozzle block 73.

In first supplying the gelling agent from the manifold 79 into the spaces 73*m* between the passages 73*c* and the plungers 73*h* through the gel supply passages 73B consisting of the joints 79*b*, gel passages 75*a*, passages 75*b* and passages 73*n*, the air vent valves 78 are opened to discharge air from the gel passage portions 75*e* above the passages 75*b* to the outside of the gel accommodating block 75. This air venting draws air bubbles from the gelling agent filled in the gel supply passages 73B running from the manifold 79 to the spaces 73*m* and from the gelling agent filled in the gel passage portions 75*e* in the gel supply passages 73B above the passages 75*b* toward the upper ends 75*f* of the gel passage portions 75*e* above the passages 75*b* and releases them from the open valves 78. This prevents the gelling agent from being supplied to the gelling agent applying nozzles 73A with air still mixed as bubbles, ensuring that the amounts of gelling agent delivered from the gelling agent applying nozzles 73A to cover the seeds and therefore the sizes of the covered seeds formed at the gelling agent applying nozzles 73A are constant.

Further, according to the gel-covering apparatus 1 of this embodiment, the air vent valves 78 are connected to the front upper inclined Dart of the nozzle block 73 so that they are forwardly inclined at about 45 degrees in a vertical plane which extends both in the longitudinal direction in which the pressurizing air cylinders 77 for pressurizing the gelling agent in the gel passages 75*a* extend and in the vertical direction in which the passages 73*c* of the nozzle block 73 extend.

Hence, the space around the gel covering section 7 occupied by each pressurizing air cylinder 77 and air vent valve 78 extends in only one almost vertical plane including the passage 73*c* of the nozzle block 73. In other words, the required space surrounding the gelling agent applying nozzle 73A can be accommodated in only one plane, not in a plurality of planes, reducing the entire surrounding space required by the gel covering section 7 or the gel-covering apparatus 1 as a whole, which in turn reduces the size of the apparatus.

Figure 20:
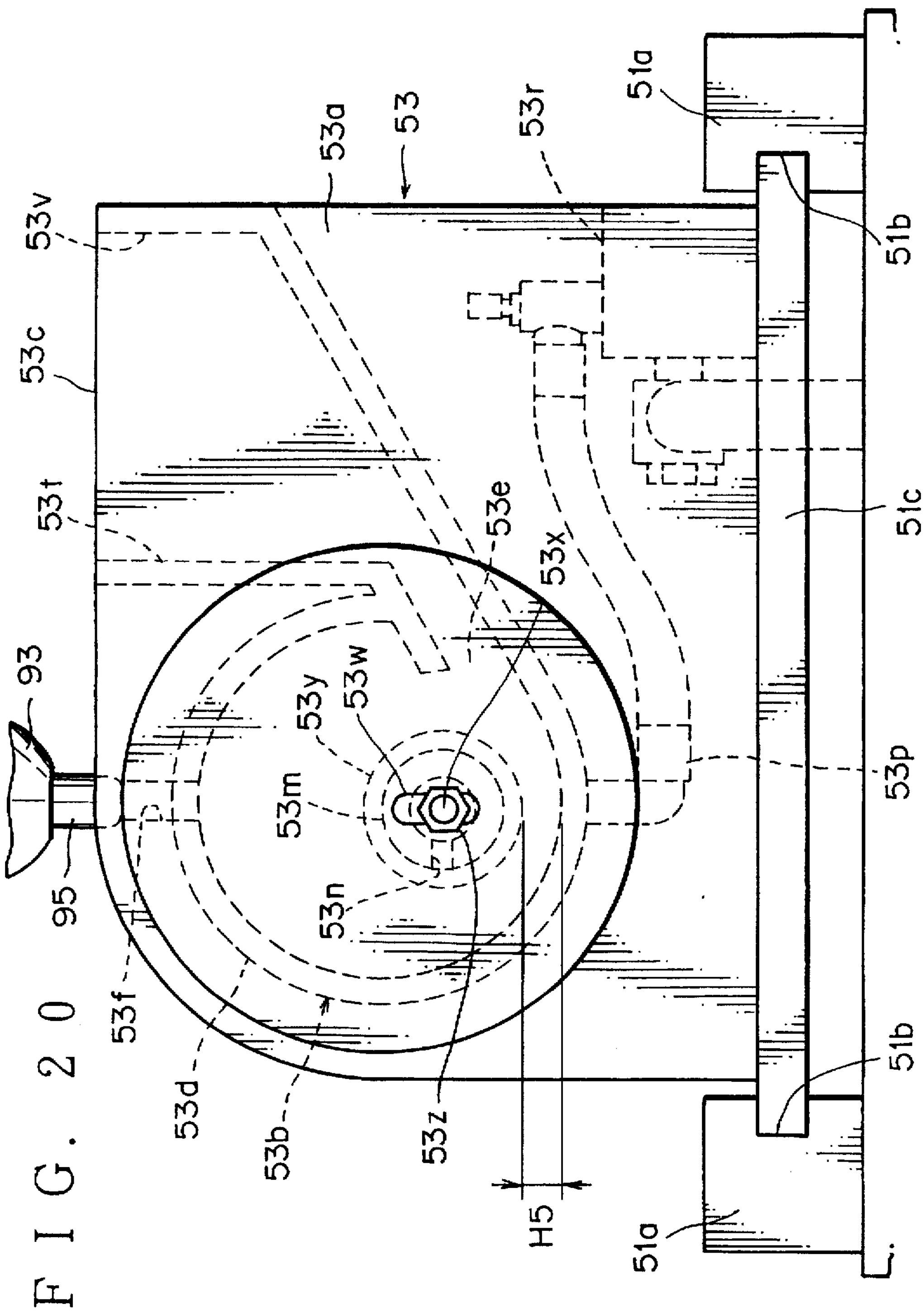
FIG. 20 is an enlarged side view of an essential portion of another embodiment of an air chamber in the tank body shown in FIG. 7.

In this embodiment, the amount of seeds that can be accommodated into the tank body portion 53*b* from the passages 73*c* of the seed supply section 5 is determined by the vertical width H1 of the slit 53*e* that communicates the hopper portion 53*c* and the tank body portion 53*b*, regardless of the amount of the seeds thrown into the hopper portion 53*c*. The distance H3 between the bottom inner circumferential surface of the tank body portion 53*b* and the air chamber 53*m* is also involved slightly in the determination of the amount of the seeds accommodated in the tank body portion 53*b*. However, as shown in FIG. 20 representing the enlarged side view of essential portions, the distance H5 from the bottom inner circumferential surface of the tank body portion 53*b* to the air chamber 53*m* may be made adjustable so that the amount of seeds accommodated into the tank body portion 53*b* from the hopper portion 53*c* of the seed supply section 5 in addition to the amount of seeds agitated in the tank body portion 53*b* may be made adjustable mainly according to this distance H5.

The construction of the seed tank 53 in the above case is briefly explained below. The side walls 53*a* of the seed tank 53 are formed with vertically elongate slots 53*w*. The air chamber 53*m* that extends through the tank body portion 53*b* between the side walls 53*a* are provided at its ends with blank plates 53*y* larger in diameter than the air chamber 53*m*. Bolts 53*x* projecting outwardly from almost the center of the blank plates 53*y* are inserted from inside the side walls 53*a* into the slots 53*w*. Nuts 53*z* are screwed over the ends of the bolts 53*x* projecting from the side walls 53*a* and, by vertically moving the position of the bolts 53*x* through the slots 53*w* the vertical height H5 of the air chamber 53*m* can be adjusted. The bin d plates 53*y* are so sized in diameter that they can cover the entire slots 53*w* whatever position in the slots 53*w* the bolts 53*x* may assume.

Figure 21:
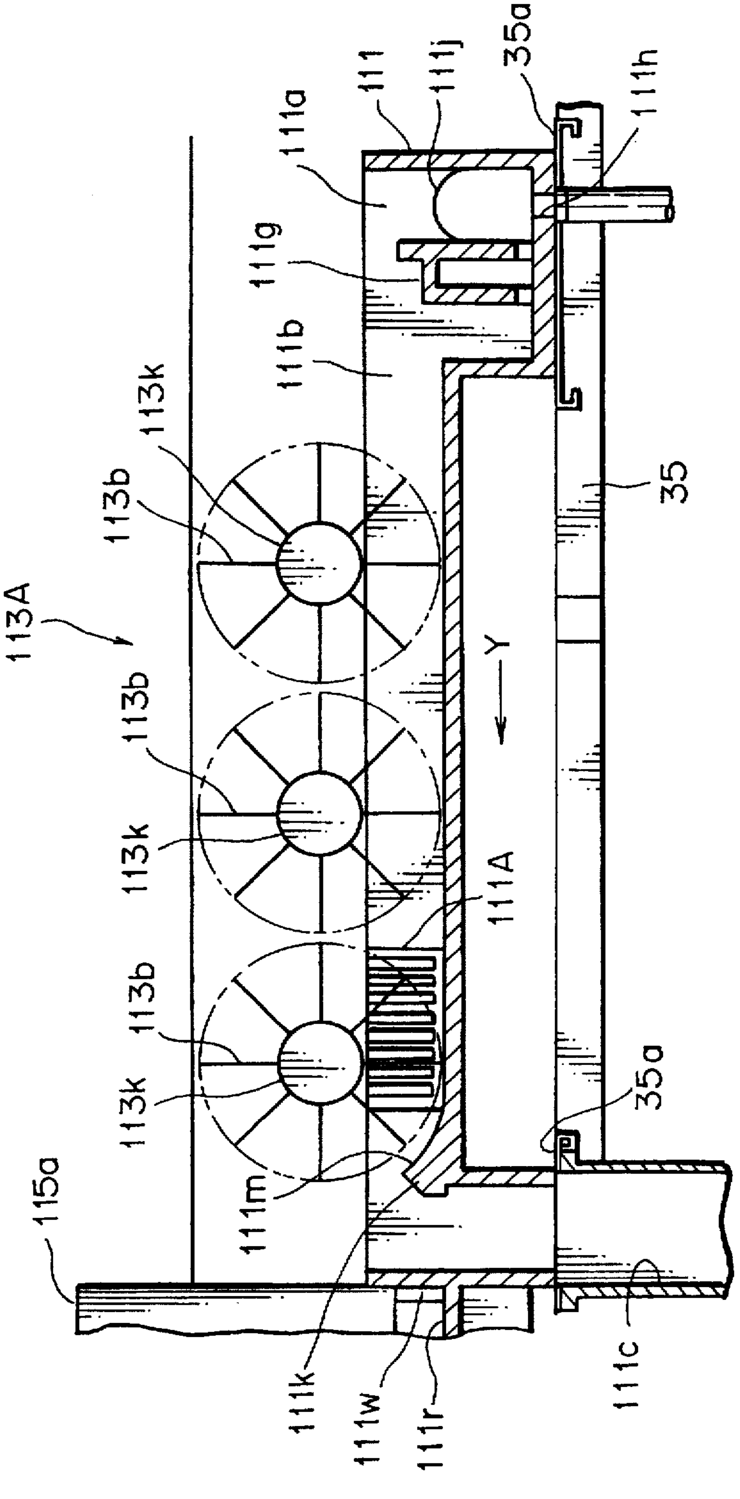
FIG. 21 is an enlarged side cross section of an essential portion of another embodiment of a gel guide mechanism in the gel hardening section shown in FIG. 16.
Figure 22:
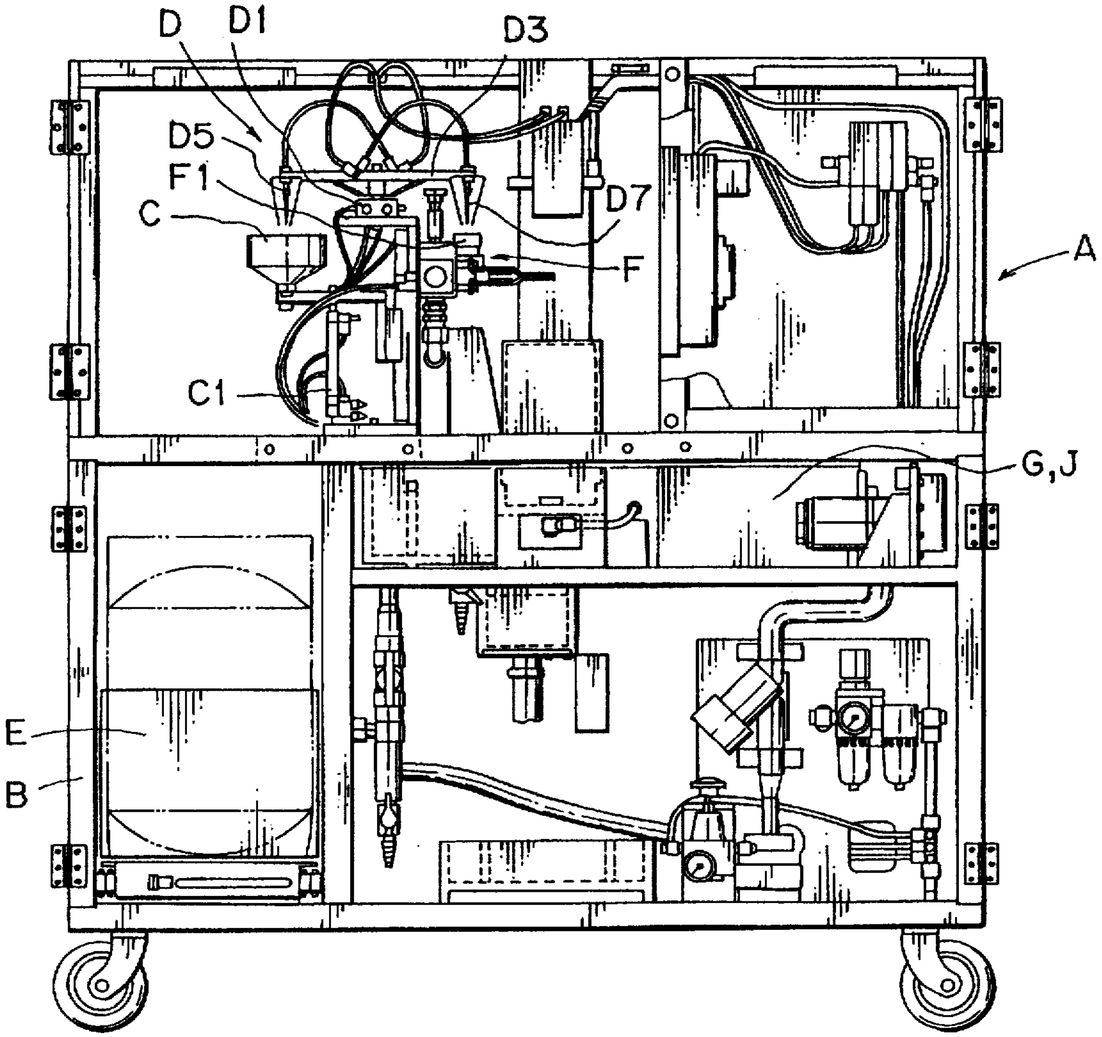
FIG. 22 is a front view of a conventional gel-covering apparatus.
Figure 23:
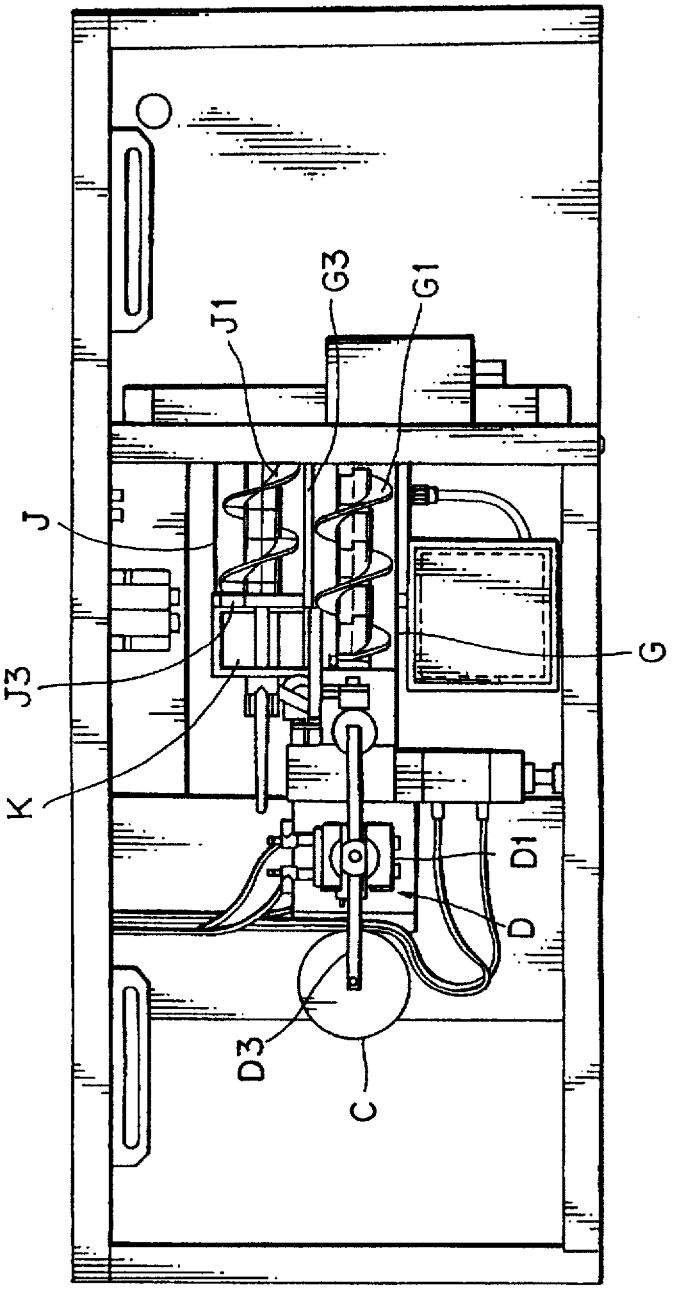
FIG. 23 is a plan view of the conventional gel-covering apparatus shown in FIG. 22.

While in this embodiment the guide paddles 113*b* of the gel guide mechanism 113 for guiding the covered seeds through the hardening agent in the hardening tank 111 are vertically erected on the surface of the belt 113*f* of the belt conveyor 113*a* at equal intervals, they may be erected on other than the belt conveyor 113*a*. For example, as shown in FIG. 21 representing the enlarged side cross section of essential parts, a plurality of rollers 113*k* with a length almost equal to the lateral width of the hardening tank 111 may be arranged at longitudinal intervals over the reaction tank 111*b* of the hardening tank 111 and a plurality of guide paddles 113*b* may be erected circumferentially spaced on the circumferential surface of each roller 113*k* in such a way that they project in radial directions to form the gel guide mechanism 113A. In this case, the guiding of covered seeds through the hardening agent in the hardening tank 111 is performed by rotating the rollers 113*k* to drive the guide paddles 113*b* of each roller 113*k* from the feed liquid tank 111*a* side to the water stopping barrage 111*k* side with the guide paddles dipping into and rising out of the hardening agent alternately.

Further, the gel-covering apparatus applying the present invention is not limited to the configuration of this embodiment of the gel-covering apparatus 1 having the seed supply section 5, seed transfer section 9, gel hardening section 11 and gel cleaning section 13, but may have different configurations in other than the gel covering section 7. In this embodiment the gel covering process in the gel covering section 7 is performed in the eight passages 73*c* in the nozzle block 73 parallelly. The number of gel covering processes performed parallelly on the seeds in the gel covering section 7 may be less or more than eight.

As described above, the apparatus for covering seeds with gel comprises: cylindrical plungers accommodated vertically movable in vertical open passages; valve seats formed at the lower ends of the vertical open passages and closed by the lower ends of the plungers; closed spaces formed between the valve seats and upper parts of the passages and closed by the upper parts of the plunger above the valve seats; a plurality of processing nozzles for covering the seeds with gelling agent; and a single manifold connected to the closed spaces in the processing nozzles; wherein the manifold is filled with the gelling agent, a gelling agent filling pressure in the manifold is increased to distribute the gelling agent from the manifold to the closed spaces in the processing nozzles, a gelling agent filling pressure in the closed spaces is increased to move the plungers in the passages to open the valve seats, and at the same time seeds to be processed are thrown from above into internal passages of the plungers so that the seeds discharged from the lower ends of the internal passages of the plungers are enclosed with the gelling agent ejected out of the passages through the valve seats.

Thus, the plurality of gelling agent supply passages that communicate the manifold with the closed spaces of the respective processing nozzles have uniform pressures almost equal to the pressure in the manifold. The gelling agent supply pressures from the gelling agent supply passages to the closed spaces of the corresponding nozzles therefore become equal, so that the amounts of gelling agents delivered from the nozzles to cover the seeds are equal making the grain sizes of the covered seeds and the amount of gelling agent used equal among the nozzles.

In the apparatus of this invention for covering seeds with gel the closed spaces in the passages communicate with the manifold through gel supply passages which are connected at one end with portions of the passages where the closed spaces are formed, the gel supply passages are connected with branched closed passages that lead from the manifold to the closed spaces and into which the gelling agent can flow, and air vent valves are connected to the ends of the closed passages and opened and closed to communicate the inside of the closed passages with the outside.

Thus, before filling the gelling agent from the manifold into the closed spaces in the supply passages, the air vent valves ape opened to discharge air that was drawn toward the terminal side of the closed passages. Therefore, the gelling agent can be prevented from being supplied to the processing nozzles while retaining air bubbles therein. This makes constant the amounts of gelling agent ejected from the processing nozzles to cover the seeds, which in turn renders constant the grain sizes of the covered seeds and the amount of gelling agent used.

Further, the apparatus of this invention for covering seeds with gel further comprises pressurizing cylinders provided adjacent to the closed spaces to increase and reduce the filling pressure of the gelling agent in the closed spaces, wherein each of the air vent valves is laid on a plane extending in directions including a direction in which the pressurizing cylinder extends and a direction in which the passage extends.

Thus, the space around the supply passage occupied by the pressurizing cylinder and air vent valve extends only in the almost vertical plane including this passage. The required space surrounding the processing nozzle therefore can be accommodated in only one plane, not in a plurality of planes, reducing the overall space required by the gel-covering apparatus as a whole and its size.

Having now fully described the invention, it will be apparent to one of ordinary skill in the art that many changes and modifications can be made thereto without departing from the spirit and scope of the invention as set forth herein.

What is claimed is:

1. An apparatus for covering seeds with gel, comprising:

a plurality processing nozzles each comprising:

a cylindrical plunger accommodated vertically movable in a vertical open passage, said plunger having a internal passage extended axially therethough;

a valve seat at a lower end of said vertical open passage, which is closed by lower end of said plunger; and a closed space in said vertical open passage, defined between said valve seat and an upper part of said plunger; and a single manifold connected to each of said closed spaces in said vertical open passages of said processing nozzles, including means for filling said gelling agent into said manifold, means for increasing a filling pressure of said gelling agent in said manifold to distribute said gelling agent from said manifold to said closed spaces of each of said processing nozzles, and means for increasing said filling pressure of said gelling agent in said closed spaces to move said plungers upwardly in said vertical open passages to open said valve seats, and means for throwing said seeds to be processed from above into said internal passages of said plungers such that said seeds discharged from lower ends of said internal passages of said plungers are enclosed with said gelling agent flown out through said valve seats.

2. The apparatus for covering seeds with gel according to claim 1, wherein each plunger has a reduced diameter portion which cooperates with an internal circumferential surface of said vertical open passages to define said closed space.

3. The apparatus for covering seeds with gel according to claim 1, wherein each plunger is normally urged downwardly by a spring to close said valve seat.

4. The apparatus for covering seeds with gel according to claim 1, wherein said vertical open passages are arranged in a row with equal space therebetween.

5. The apparatus for covering seeds with gel according to claim 4, wherein eight of said vertical open passages are arranged in said row.

6. The apparatus for covering seeds with gel according to claim 1, wherein said closed spaces in said vertical open passages each communicates through a respective gel supply passage with said manifold, said gel supply passage is connected with a branched closed passage into which said gelling agent flowing from said manifold to said closed space can flow, and an air vent valve is connected to an end of said closed passage and opened and closed to communicate with an inside of said closed passage with an outside.

7. The apparatus for covering seeds with gel according to claim 6, further comprising pressurizing cylinders in communication through said gel supply passages to respective ones of said closed spaces for increasing and reducing said filling pressure on said gelling agent in said closed spaces, wherein said air vent valves each extends on a same plane as a respective one of said pressurizing cylinders and of said vertical open passages extends.

8. The apparatus for covering seeds with gel according to claim 7, further comprising check valves provided at respective ones of said gel supply passages for preventing a backflow of said gel from said gel supply passage toward said outside.

* * * * *